United States Patent

Dugat

(10) Patent No.: US 9,475,653 B2
(45) Date of Patent: Oct. 25, 2016

(54) CLOSED GAP TRANSFER FOR A CONVEYOR AND METHOD OF USING SAME

(71) Applicant: Robotica, Inc., Spring, TX (US)

(72) Inventor: Jay Mark Dugat, Spring, TX (US)

(73) Assignee: Robotica, Inc., Cypress, TX (US)

( * ) Notice: Subject to any disclaimer, the term of this patent is extended or adjusted under 35 U.S.C. 154(b) by 0 days.

(21) Appl. No.: 14/859,295

(22) Filed: Sep. 19, 2015

(65) Prior Publication Data

US 2016/0083196 A1 Mar. 24, 2016

Related U.S. Application Data

(60) Provisional application No. 62/053,009, filed on Sep. 19, 2014.

(51) Int. Cl.
*B65G 47/54* (2006.01)
*B65G 13/07* (2006.01)
*B65G 13/10* (2006.01)
*B65G 15/50* (2006.01)

(52) U.S. Cl.
CPC .............. *B65G 47/54* (2013.01); *B65G 13/07* (2013.01); *B65G 13/10* (2013.01); *B65G 15/50* (2013.01)

(58) Field of Classification Search
CPC ...... B65G 13/10; B65G 15/50; B65G 47/54; B65G 13/07
USPC ......................................... 198/370.09, 370.1
See application file for complete search history.

(56) References Cited

U.S. PATENT DOCUMENTS

| | | | | |
|---|---|---|---|---|
| 1,737,762 A * | 12/1929 | Howe | .................... | B65G 47/54 |
| | | | | 186/20 |
| 3,232,409 A * | 2/1966 | Pierson | .................... | B65G 47/54 |
| | | | | 198/349 |
| 4,730,718 A * | 3/1988 | Fazio | .................... | B65G 47/54 |
| | | | | 198/370.1 |
| 4,962,841 A * | 10/1990 | Kloosterhouse | ....... | B65G 47/54 |
| | | | | 198/370.09 |
| 5,165,516 A * | 11/1992 | Reed | .................... | B65G 47/54 |
| | | | | 198/370.1 |
| 5,984,078 A | 11/1999 | Bonnet | | |
| 6,227,377 B1 | 5/2001 | Bonnet | | |
| 6,629,018 B2 * | 9/2003 | Mondie | .................... | B65G 47/31 |
| | | | | 198/460.1 |
| 6,843,365 B2 * | 1/2005 | Baker | .................... | B65G 47/54 |
| | | | | 198/813 |
| 6,907,978 B2 * | 6/2005 | Evans | .................... | B65G 47/54 |
| | | | | 198/370.09 |
| 8,561,790 B2 * | 10/2013 | Brayman | ............. | B65G 13/071 |
| | | | | 198/370.01 |
| 8,684,169 B2 * | 4/2014 | Itoh | .................... | B65G 13/075 |
| | | | | 198/370.06 |
| 9,216,862 B2 * | 12/2015 | Wallace | ................. | B65G 47/54 |
| 2015/0144536 A1 | 5/2015 | Dugat | | |

* cited by examiner

*Primary Examiner* — Leslie A Nicholson, III
*Assistant Examiner* — Keith R Campbell
(74) *Attorney, Agent, or Firm* — JL Salazar Law Firm

(57) ABSTRACT

A transfer device and method diverts packages about a conveyor. The conveyor has a conveyor path extending between locations of a facility. The transfer includes a frame positionable about the conveyor, rollers rotationally supported on the frame (the rollers non-aligned with the conveyor path to define a transfer path way from the conveyor path), belts rotationally supported on the frame between the rollers with a closed gap therebetween (the belts aligned with the conveyor path), and a tub movably coupled to the frame to selectively lift the rollers above the belts to engage the packages whereby the packages are selectively movable to locations away from the conveyor path.

23 Claims, 20 Drawing Sheets

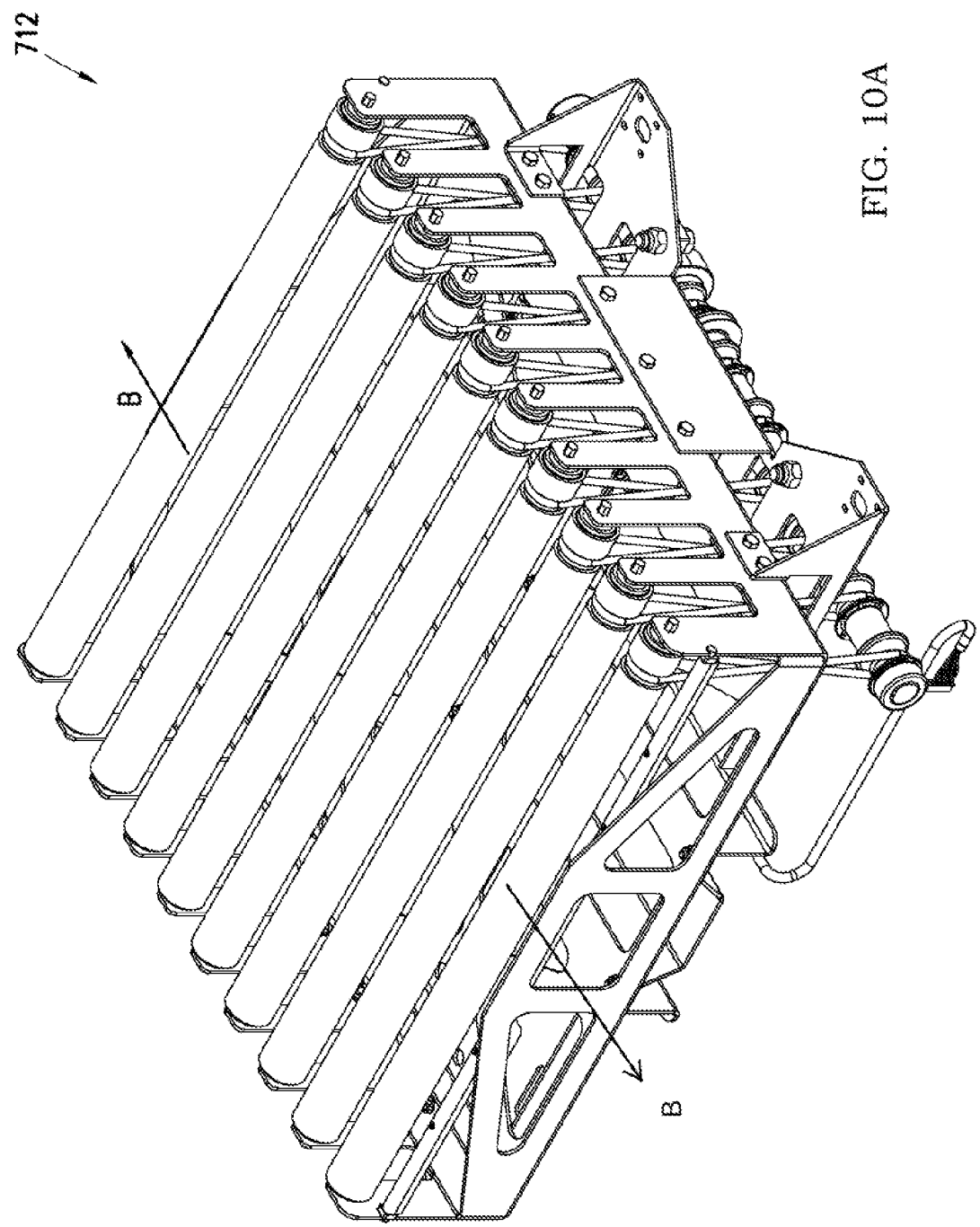

CLOSED GAP TRANSFER FOR A CONVEYOR AND METHOD OF USING SAME

CROSS-REFERENCE TO RELATED APPLICATIONS

This application claims the benefit of U.S. Provisional Application No. 62/053,009 filed on Sep. 19, 2014, the entire contents of which is hereby incorporated by reference herein.

BACKGROUND

Material handling systems may employ conveyors to transport packaging about facilities. The conveyors may include rollers capable of passing rigid packages to desired locations in the facility. Examples of conveyors are provided in U.S. patent application Ser. Nos. 14/550,826 and 62/210,310, the entire contents of which are hereby incorporated by reference herein. Some conveyors may have devices, such as transfers, tilt trays, and pushers, used to divert packages away from a main conveyor to desired locations. Examples of conveyor devices are provided in U.S. Pat. Nos. 5,984,078 and 6,227,377.

Standard material handling equipment used in distribution and order fulfillment is designed to transport and sort known shaped rigid corrugate packaging, containers, or plastic totes. Accordingly, many of the containers are designed to have a flat rigid surface of a standard size (e.g., at least 8 inches (15.24 cm) in length) and a standard shape (e.g., cuboid) to accommodate material handling equipment.

The rapid growth of direct to consumer business is increasing the use of various types of packaging, such as poly bag, bubble-wrapped and other non-rigid packaging. Fulfillment of individual orders by direct shipment has prompted the use of bags and small boxes to save shipping cost. Further, with the advent of sites to enable individuals to sell items to buyers across the globe, material handling has become less standardized and requires increasing versatility. Standard conveyors and diverters may be designed to handle certain shapes and sizes of rigid packages. However, automatic sorting of non-rigid packaging may become difficult and potentially bottleneck processing shipments.

SUMMARY

In at least one aspect, the disclosure relates to a transfer device for diverting packages about a conveyor. The conveyor has a conveyor path extending between locations of a facility. The transfer includes a frame positionable about the conveyor, rollers rotationally supported on the frame (the rollers non-aligned with the conveyor path to define a transfer path way from the conveyor path), belts rotationally supported on the frame between the rollers with a closed gap therebetween (the belts aligned with the conveyor path), and a tub movably coupled to the frame to selectively lift the rollers above the belts to engage the packages whereby the packages are selectively movable to the locations away from the conveyor path.

In another aspect, the disclosure relates to an integrated transfer for diverting packages about a conveyor, the conveyor having a conveyor path extending between locations of a facility. The transfer includes a frame positionable about the conveyor, a roller unit supported on the frame, and belts rotationally supported on the frame between the rollers with a closed gap therebetween. The roller unit comprising rollers and a tub. The rollers are non-aligned with the conveyor path to define a transfer path way from the conveyor path. The belts are rotationally supported on the frame between the rollers with a closed gap therebetween. The belts are aligned with the conveyor path. The tub is movably coupled to the frame to selectively lift the rollers above the belts to engage the packages whereby the packages are selectively movable to the locations away from the conveyor path.

In yet another aspect, the disclosure relates to a method of transferring packages about a conveyor. The method involves providing a transfer comprising a frame, rollers, and belts. The transfer has a closed gap between the belts and the rollers. The method further involves positioning a transfer adjacent a conveyor to receive the packages therefrom, advancing a portion of the packages along a main conveyor path of the conveyor and across the transfer by rotationally driving the belts, and selectively diverting a portion of the packages away from the main conveyor path by lifting the rollers above the belts to engage the portion of the packages and rotating the rollers.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures, may be shown exaggerated in scale or in schematic in the interest of clarity and conciseness.

FIGS. 10A-10E show various views of a portion of the transfer of FIG. 8A depicting the integrated roller unit.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The present disclosure relates to transfers (or diverts or diverters) for use with conveyors to change direction of flow of packages away from a main path of a conveyor. The transfers may include a frame connectable to the conveyor, belts (or bands, cross-members, cross-belts) to allow flow along the conveyor path, rollers to move the packages in a direction away (e.g., right angle) from the conveyor path, and a driver to activate the belts. The rollers may be selectively lifted above the belts to divert the packages to a location away from the main conveyor path. The driver may be used to selectively lift and advance the rollers with the package thereon so that the packages are selectively transferred.

The transfer may be used to provide multi-directional material handling capabilities of all types of packaging, such as standard packages having a rigid structure, standard shape (e.g., cuboid or box), and standard size (e.g., having a length of at least about 8 inches (15.24 cm) in length)); irregular packages having a non-rigid (e.g., flexible) structure, an irregular shape (non-cuboid), and/or a non-standard size (e.g., having a maximum dimension of less than about 8 inches (15.24 cm) in length); and/or other packaging.

The belts may be positioned between the rollers and shaped to close a gap therebetween to minimize items (e.g., packaging) falling into or becoming stuck in the gap, and/or to facilitate the passage of various packages. The transfer may also include support structures, such as tubs, integrated frames, and guided drivers to facilitate operation of the transfer. The transfer is intended to reduce costs while facilitating material handling and/or transfer capabilities.

Figure 1:
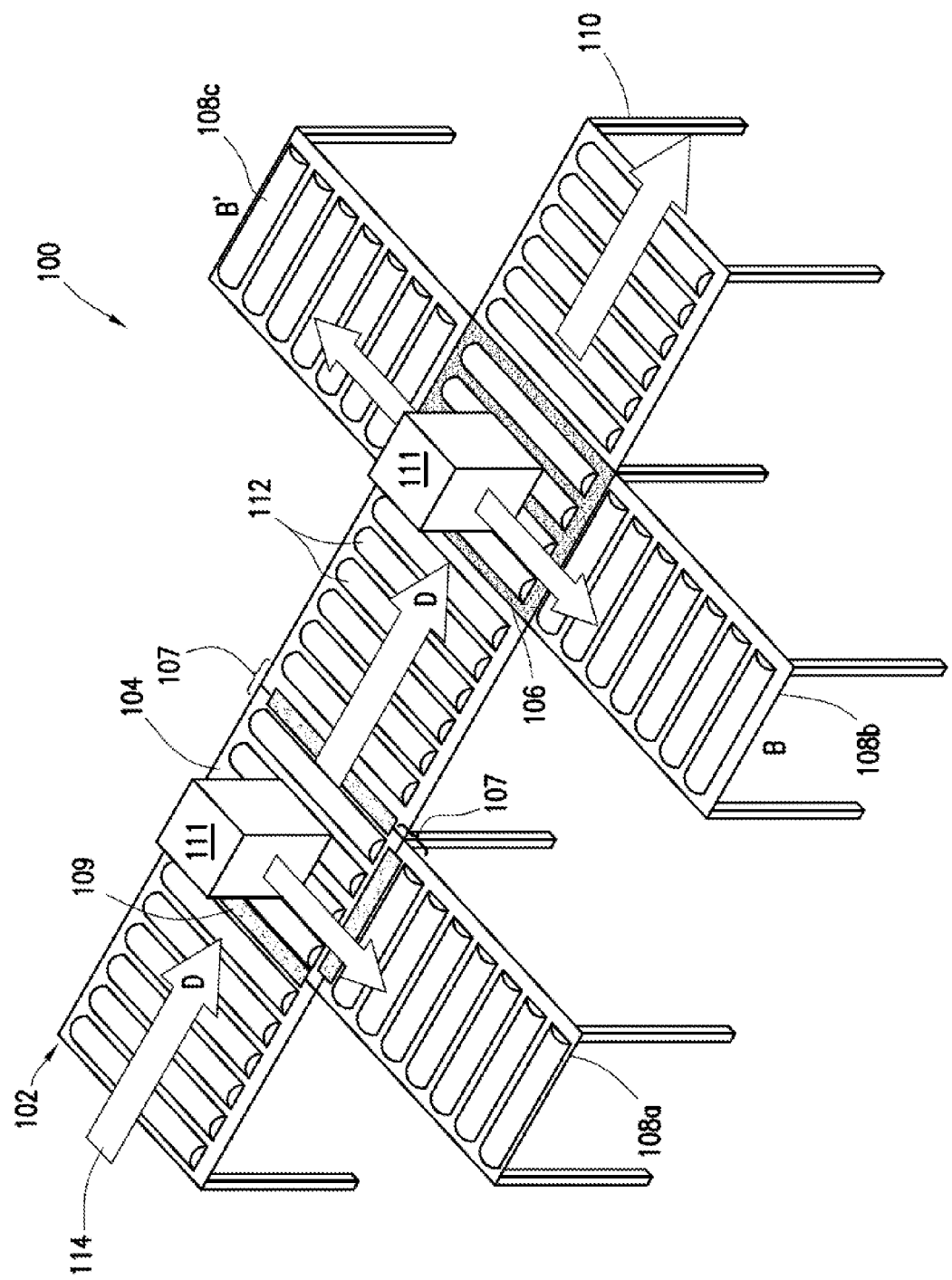
FIG. 1 is a schematic diagram depicting a conveyor system including a main conveyor, transfers, and side conveyors.

FIG. 1 depicts an example conveyor system 100 usable with embodiments of the present disclosure. The conveyor system 100 includes a main conveyor 102, a narrow band (or wide gap) transfer 104, a closed gap transfer 106, and side conveyors 108a-c. The main conveyor 102 may include a conventional frame 110 with elongate rollers 112 thereon to rotationally pass packages 111 along a main conveyor path 114 in a direction D as indicated by the linear arrows.

The main conveyor 102 may be of various shapes and dimensions positionable about a facility to transport the packages 111 between locations. The conveyor system 100 may be provided with various lengths of the main conveyor 102 and various conveyor components, such as the side conveyors 108a-c as shown, and/or sort bins, loading docks, etc. One or more transfers 104,106 may be provided along the main conveyor 102 to direct the packages 111 about the conveyor system 100. In the example shown, the transfers 104, 106 are provided along the conveyor system 100 to facilitate selective movement of the packages 111 away from the conveyor path 114 and to another desired direction. Various combinations of the main conveyor 102, one or more narrow band 104 and/or closed gap transfers 106, and/or side conveyors 108a-c may be used.

The main conveyor 102 may be positioned adjacent the narrow band transfer 104 with a transition 107 defined therebetween. Head and tail stock rollers of sections of the main conveyor 102 and the narrow band transfer 104 may generate gaps therebetween. The bands of the narrow band transfer 104 may have a diameter and clearance requirement creating gaps along the transition 107 large enough for non-standard (e.g., small) and non-rigid packages 111 to fall through. The narrow band transfer 104 may also have internal gaps as is discussed further herein.

One solution to overcome gaps between ends of the main conveyor 102 and the narrow band transfer 104 is to permanently affix a bridge 109 (e.g., a rigid metal or plastic plate) along the transition 107 to bridge the gap, thereby mating the conveyors and the transfers end-to-end or end-to-side. In at least some cases, such low tech solutions may be limited with regards to weight, speed, and rapid sorting needs for larger material handling operations.

The transfers 104, 106 may permit movement of the packages 111 along the main conveyor path 102 until the transfers 104, 106 are activated to divert the packages 111 away from the main conveyor path 102. Such activation may occur based on decision making, data processing and analysis, or as desired.

As shown, narrow band transfer 104 provides for transfer of the package 111 to a side conveyor 108a as indicated by the lateral arrow. In this configuration, transfer 104 acts as a one way right angle transfer. An example of a narrow band right angle transfer that may be used includes ITOH™ and POP UP™ Sortation commercially available from CASI LLC™ at www.cornerstonecautosys.com. Other examples of narrow band transfers include a belt conveyor with overhead pushers or other state-of-the-art material handling equipment.

The closed gap (or lift) transfer 106 provides for transfer of the packages 111 to side conveyors 108b,c. The closed gap transfer 106 is depicted as a right angle transfer capable of diverting packages to multiple side conveyors 108b,c along directions B, B-. In this configuration, the closed gap transfer 106 acts as a multi-directional transfer as is described further herein.

While the transfers 104, 106 are shown as diverting packages 111 to side conveyors 108 a-c at right angles (perpendicular) to the main conveyor 102, any angle may be provided. The conveyor system 100 may also be provided with various other components (not shown), such as markers, cutters, sorters, scanners, processors, controllers, tilt trays, cross-belt sorters, etc. Examples of conveyor components are described in U.S. patent application Ser. Nos. 14/550,826 and 62/210,310, previously incorporated by reference herein.

Figure 2:
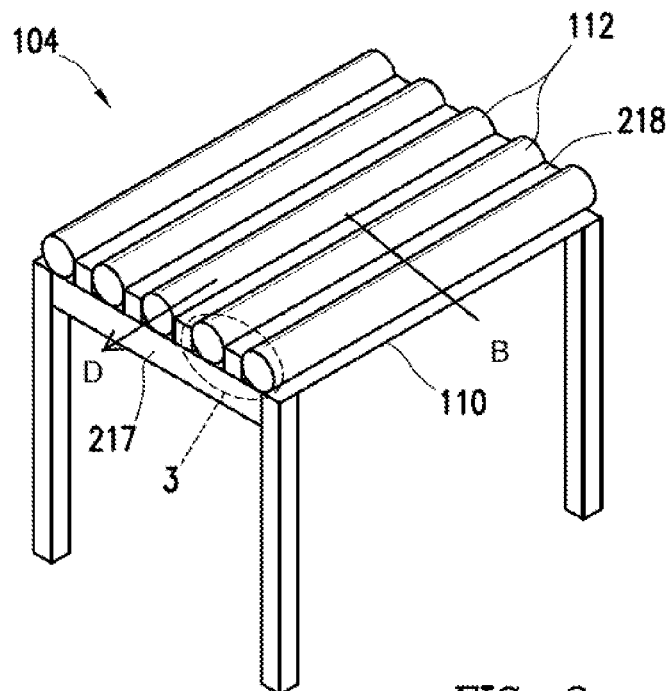
FIG. 2 is a schematic view of a narrow band transfer.
Figure 3A:
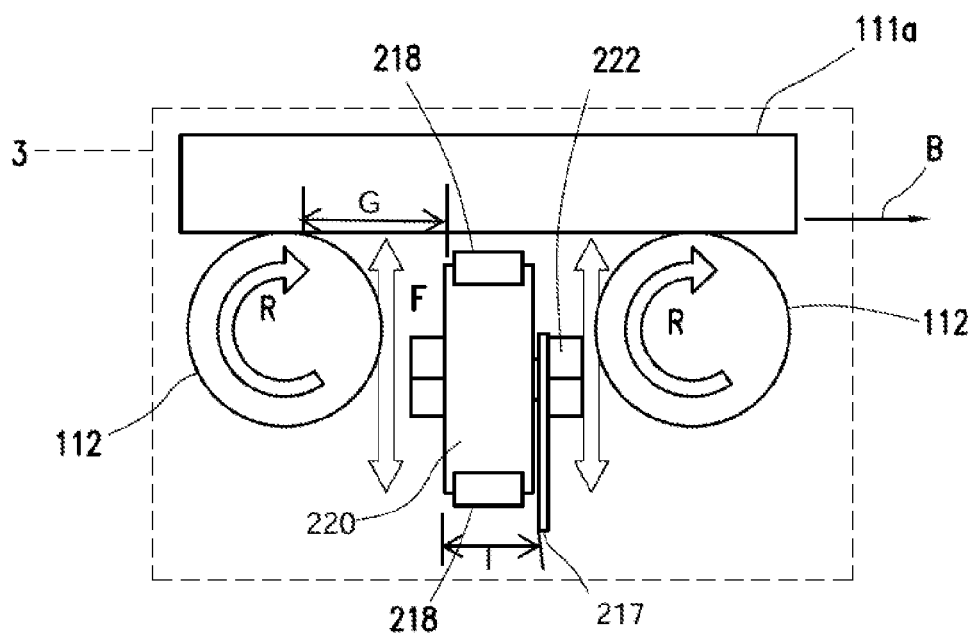
FIGS. 3A-3B are plan views of a portion 3 of the narrow band transfer of FIG. 2 having bands in a lowered and raised position, respectively, and with a rigid package thereon.
Figure 3B:
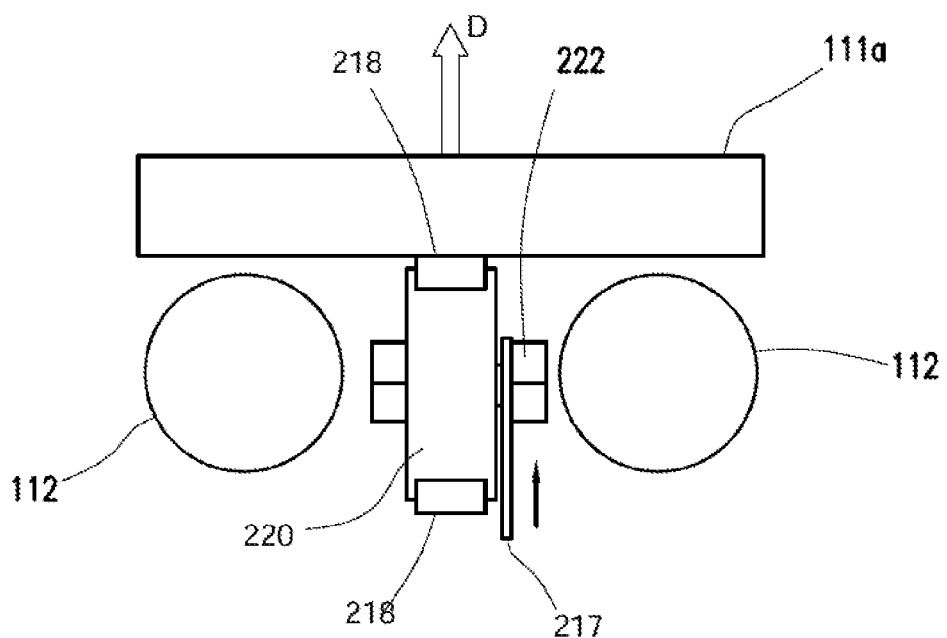
Figure 3C:
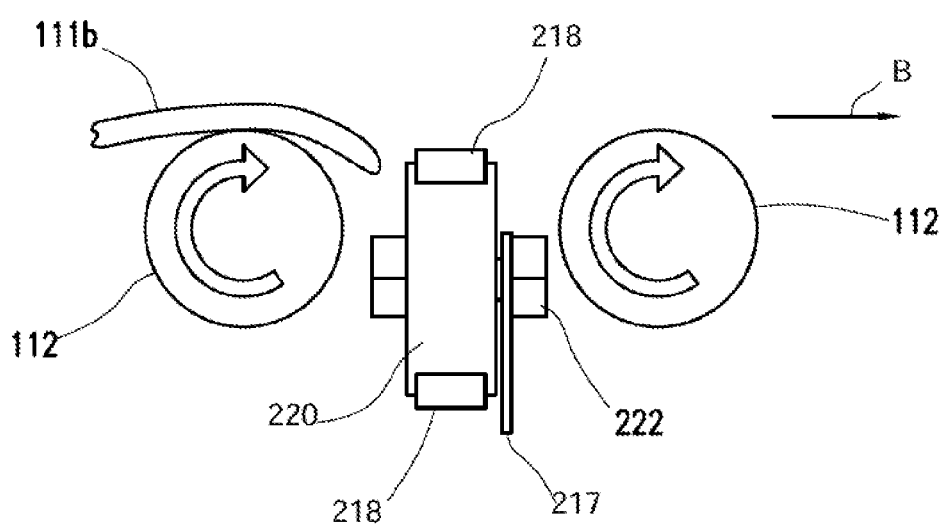
FIG. 3C shows the narrow band transfer of FIG. 3B with a non-rigid package thereon.

FIGS. 2-10E depict various transfer devices that may be used with the conveyor system 100. The transfers are illustrated in various preferred and non-limiting embodiments. FIGS. 2-3C show an example narrow band (wide gap) transfer 104. FIGS. 4A-6B show an example closed gap (wide band) transfer 106a having T-belts and a cam driver. FIGS. 7A-10E show an example integrated closed gap transfer 106b having an integrated belt unit and an integrated roller unit.

Referring to FIGS. 2-3C, an example of the narrow band transfer 104 is shown in greater detail. FIG. 2 is a perspective view of the narrow band transfer 104. FIGS. 3A-3B show portion 3 of the narrow band transfer 104 in various positions to transfer a rigid package 111a. FIG. 3C shows the transfer device 104 of FIG. 3B with a non-rigid package 111b thereon. As demonstrated by these figures, the narrow band transfer defines a gap G that may affect transport of irregular packages.

The narrow band transfer 104 includes a frame 110, rollers 112, and narrow bands 218. The rollers 112 and bands 218 may be supported on the frame 110 by a carriage 217. The narrow bands 218 are supported between the rollers 112 on pulley rollers 220 carried by the carriage 217. Further, the carriage 217 may be attached to the pulley rollers 220 by one or more fasteners 222.

FIG. 3A depicts a portion 3 of the narrow band transfer device 104 of FIG. 2 showing the rollers 112 in a raised position above the bands 218 such that the rollers 112 are positioned to contact and transfer a rigid package 111a in a transfer linear direction B in a direction away from the main conveyor path (e.g., 114 of FIG. 1). FIG. 3B shows the narrow band transfer device 104 with the rollers 112 in a lowered position below the bands 218 so that the bands 218 contact the package 111a.

As shown by FIGS. 3A-3B, the package 111a may be moved along the narrow band transfer 104 in a direction determined by whether the bands 218 or rollers 112 are in the highest position. If the spinning surface of the bands 218 are in the highest point as show in FIG. 3B, the bands 218 make contact with the rigid package 111a causing the rigid package 111a to move in the main linear direction D of rollers 112. The bands 218 may transfer a rigid package (item) 111a in a main linear direction D by rotating the pulley rollers 220 to drive the belts 218 and rotating the rollers 112 in a clockwise direction R.

If the rollers 112 are in the highest position as shown in FIG. 3A, the rollers 112 make contact with the rigid package 111a causing the rigid package 111a to move in a transfer linear direction B away from the main linear direction D. The narrow band transfer 104 may be selectively activated to engage the rollers 112 to transfer the rigid package 111a in a direction B perpendicular to the direction D by lifting and rotating the rollers 112. Raising the rollers 112, as shown in FIG. 3A, allows the surface of the rollers 112 to engage the rigid package 111a to move the rigid package 111a at an angle (e.g., ninety degrees) to the transfer conveyor path along direction B.

The rollers may be selectively elevated above the bands 218 to switch directions of the rigid package 111a to flow in a second linear direction B along the rollers 112 (see, e.g., FIG. 3A). For example, the rollers 112 may be moved in a lift direction F when the rollers 112 are moved as shown in FIG. 3A to engage and lift the rigid package 111a. The rollers 112 then advance the rigid package 111a in a direction B away from direction D.

The bands 218, pulleys 220, and fasteners 222 define an interference fit I. The width of the interference fit I defines a distance from the rollers 112, thereby defining a gap G between the rollers 112 and the bands 218. Further, and as illustrated, due to the nature and functionality of right angle material transfers, the powered pulleys 220 may require a certain amount of clearance or interference gap G between rollers 112 in order to permit proper functionality for material handling.

For rigid applications as shown in FIGS. 3A-3B, the gap G may not affect performance. However, for non-rigid applications as shown in FIG. 3C, the gap G may provide space for receiving at least a portion of the non-rigid package 111b or other items. As shown by FIG. 3C, the gap G between the rollers 112 and the bands 218 may cause the non-rigid package 111b to fall into the gap G, thereby affecting handling of non-rigid package 111b and/or other irregularly sized and/or shaped packages. The gap G may cause irregular packages, such as non-rigid package 111b, to fall into the gap G which may result in jams, lost items, failures, and/or other interruptions in transport.

Figure 4A:
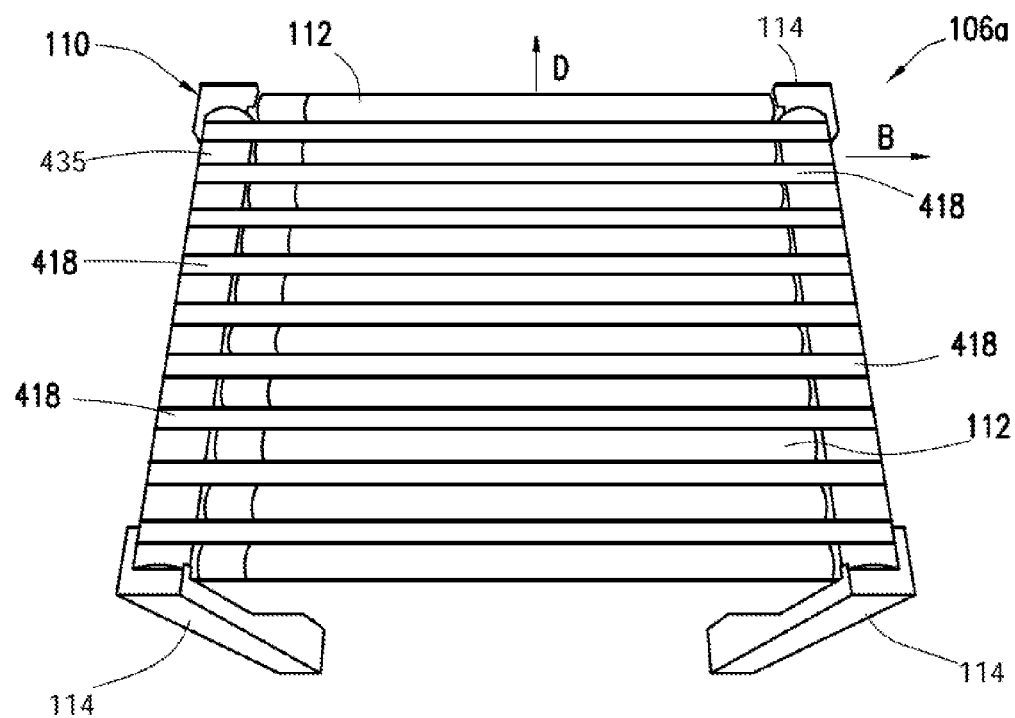
FIGS. 4A-4C are top perspective, rear perspective, and exploded perspective views, respectively, of a closed gap transfer.
Figure 4B:
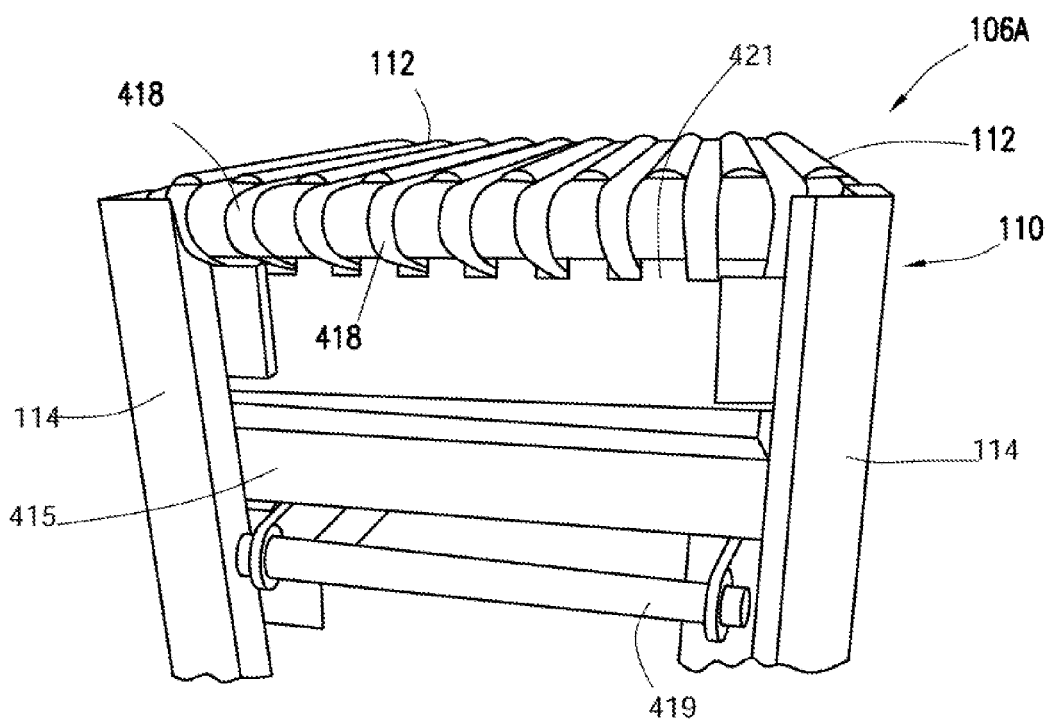
Figure 4C:
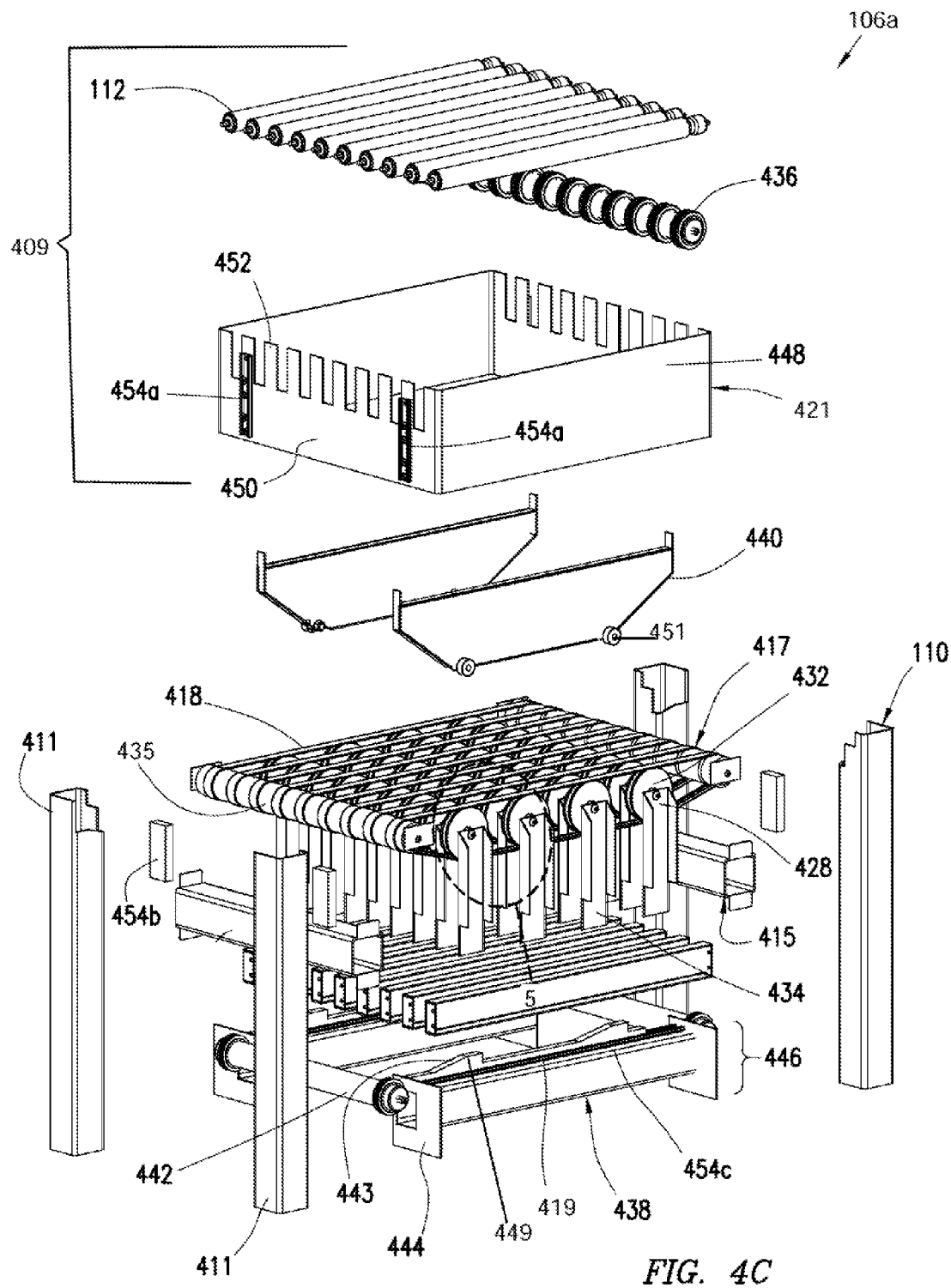
Figure 5A:
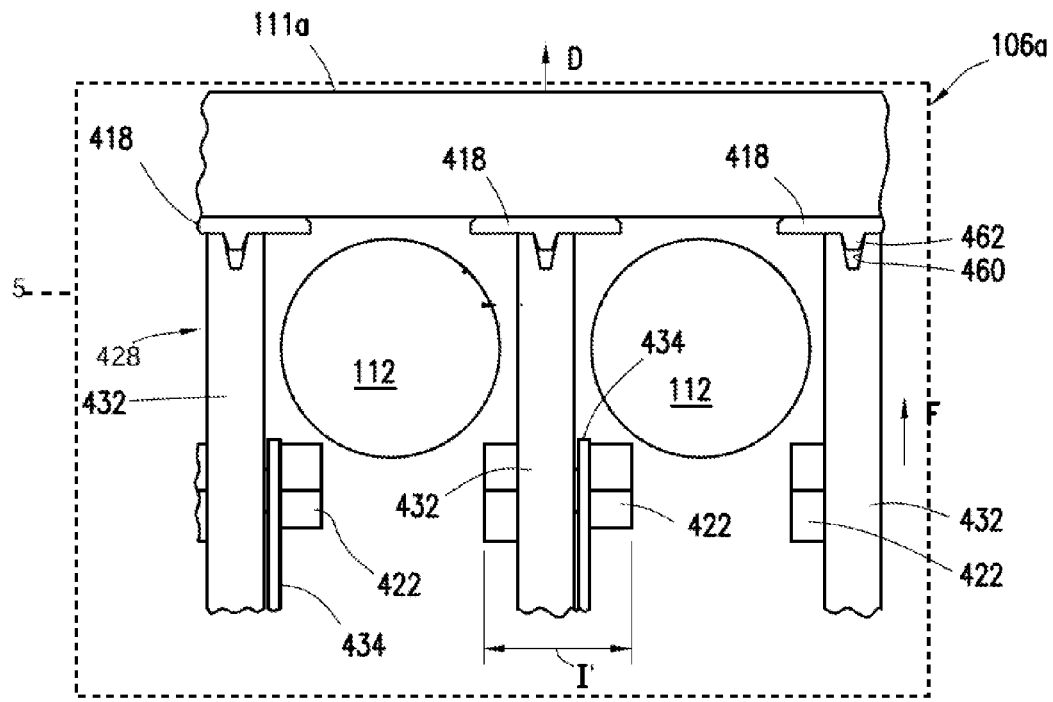
FIGS. 5A and 5B are side sectional views of a portion of the closed gap transfer having cross-members in a raised and lowered position, respectively, with a rigid package thereon.
Figure 5B:
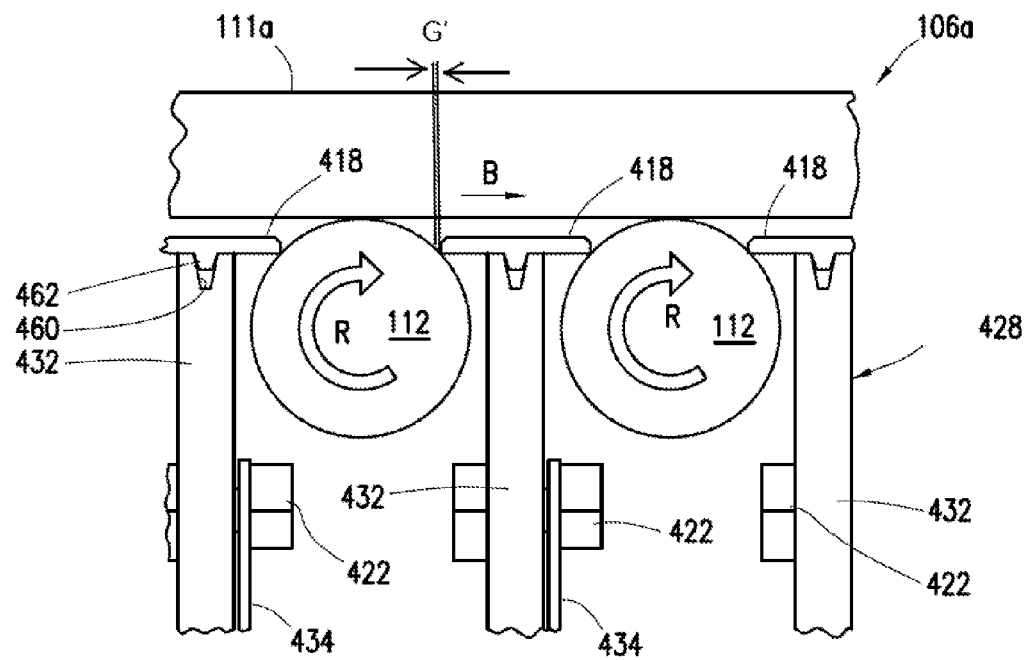
Figure 6A:
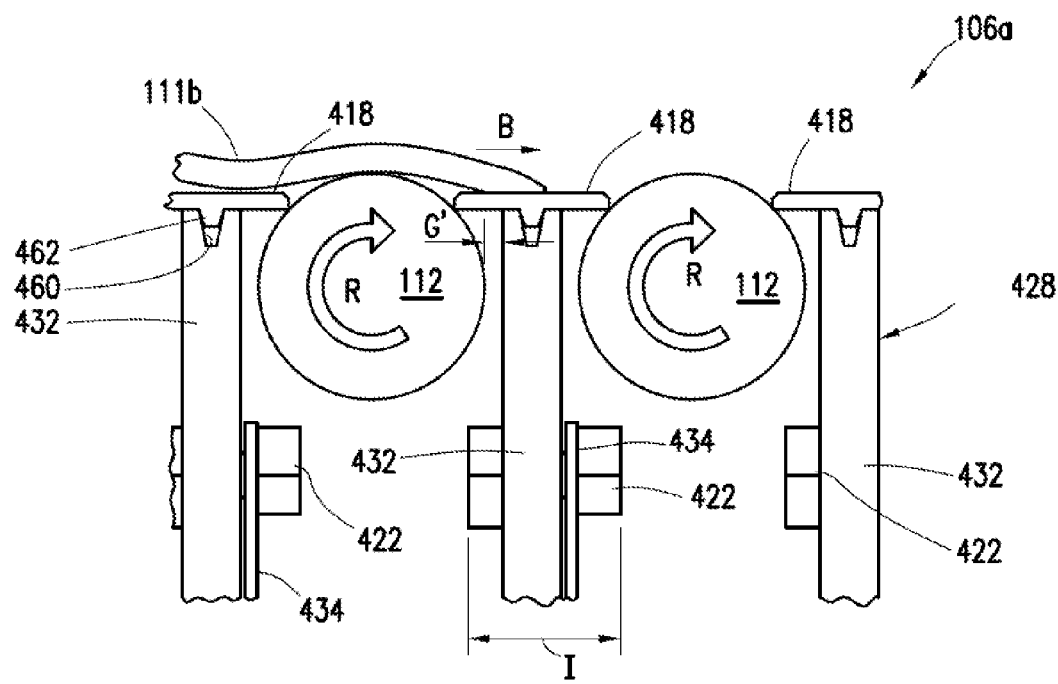
FIGS. 6A and 6B are side sectional views of the closed gap transfer of FIG. 5B having a non-rigid package and a non-standard sized package, respectively, thereon.
Figure 6B:
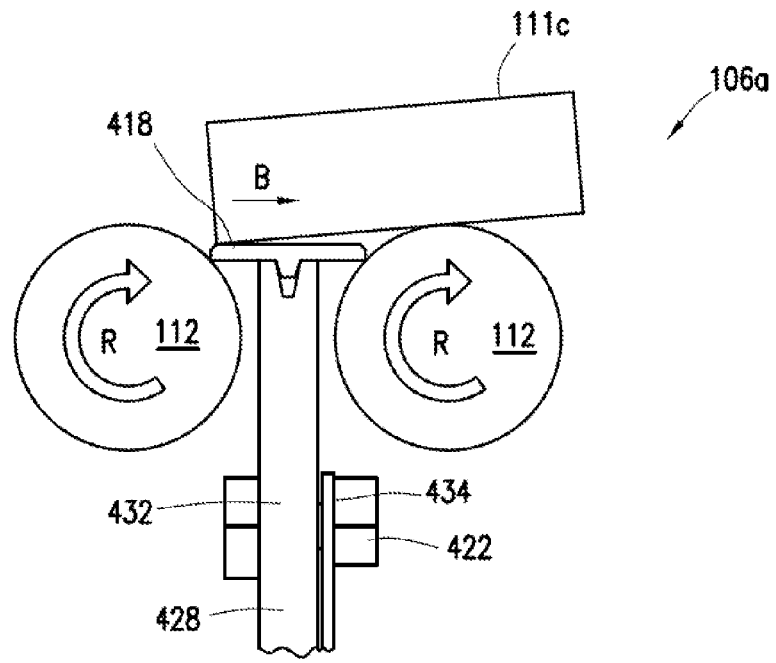

Referring to FIGS. 4A-6B, an example of the closed gap transfer 106a is shown in greater detail. FIGS. 4A-4C depict top perspective, front perspective, and exploded views, respectively, of the closed gap transfer 106a. FIGS. 5A and 5B show a portion of the closed gap transfer 106a with the rollers 112 in a lowered and a raised position, respectively, to transport a rigid package 111a. FIGS. 6A and 6B show the closed gap transfer 106a of FIG. 5B transferring a non-rigid and a non-standard sized package, respectively.

The closed gap transfer 106a includes a frame 110, a roller assembly 409, a belt assembly 417, and a driver 419. The frame 110 includes legs 411 and the frame supports 415. The frame 110 may be provided with one or more legs 411 supporting the roller assembly 409 and belt assembly 417. The frame 110 may be adjustable and/or repositionable to allow for various size and height constraints. Further, the frame supports 415 may be provided between the legs 411 to provide stability to the legs 411 and/or provide support for the roller assembly 409 and the belt assembly 417.

The roller assembly 409 includes rollers 112, roller spindle 436, and tub 421. The tub 421 is movably supported on the frame 110 by the driver 419. The tub 421 includes end walls 450 and sidewalls 448. The rollers 112 and roller spindle 436 are rotationally supported on the tub 421. More specifically, the rollers 112 may be rotationally mounted on the top of the tub 421 along tub end walls 450 to provide a uniform strong vertically adjustable mount. The tub 421 is provided with spaced apart roller supports 452 for receiving ends of the rollers 112. The roller spindle 436 is positioned on the tub 421 and aligned with the roller supports 452 to rotatably engage the rollers 112.

The roller spindle 436 is rotatable by the driver 419 to rotate the rollers 112. With regards to the transfer of packages 111 (materials) in the transfer linear direction B, the transfer apparatus 106a may include one or more roller spindle 436 positioned between legs 411, outside the row of rollers 112, and near a top of the transfer apparatus 106a. These roller spindles 436 may be powered and/or motorized by the driver 419. Bearing 454a may be provided on the tub 421 to facilitate vertical movement thereof.

The belt assembly 417 includes the T-belts 418, pulleys 428, and a pulley drive roller 435. The pulleys 428 include the pulley rollers 432 rotationally supported by pulley supports 434. The pulley supports 434 may include vertical members connected to the pulley rollers 432 and horizontal members supported on the frame 110. The pulley drive rollers 435 are also supported on the frame 110 on opposite sides of the series of pulley rollers 432. The pulley drive roller 435 has grooves to receive the T-belts 418 and is rotationally driven by the driver 419 to rotate the T-belts 418.

With regards to the passage of packages 111 in the main linear direction D, the transfer apparatus 106a may include one or more pulley drive rollers 432 at an end of the belt assembly 417 driven by driver 419 to rotate the T-belts 418. The driver 419 may comprise, for example, a castalon drive, to supply movement to the T-belts 418 in communication with pulley drive rollers 435, and so that appropriate friction and driving force may be enabled by the pulley drive rollers 435.

The driver 419 may include a motor (or other power source) coupled to the roller assembly 409 and the belt assembly 417 to drive the rollers 112 and the T-belts 418, and a lift 438 to lift and lower the roller assembly 409. The motor may be coupled to the roller spindle 436 and the pulley drive roller 435 to rotationally drive the rollers 112 and T-belts 418, respectively. The driver 419 may include other devices, such as controllers, power sources, electronics, etc.

The lift 438 may include a cam assembly 446 supported on the frame 110. In an example and as illustrated in at least FIG. 4C, the cam assembly 446 may include, for example, a cam 440, the linear bearing 454c, the cam follower 442, the timer (timing belt) 443, a cam mount cross member 444 having a timing belt return channel. The cam mount 444 is supported on the frame 110 and rotationally supports the cam follower 442 and the timer 443 thereon. The cam 440 is movably positioned within the tub 421 to lift the tub 421 based on the engagement by the cam follower 442.

The motor may be used to rotate the cam follower 442 along the cam mount 444 to drive the timer 443. The timer 443 may be a four point cam lift rotated by the cam follower 442 and used as a force transfer structure to lift the tub 421 at a desired timing. The timer 443 is provided with a raised ramp 449 that engages wheels 451 on the cam mount 440. The cam 440 is fixed to the tub 421 such that engagement of the ramp 449 with the cam mount 440 also lifts the tub 421 and the rollers 112 connected thereto. The timer 443 may be selectively rotated to achieve the lifting of the rollers 112 at a desired time when packages are thereon to selectively divert packages 111.

Referring to FIGS. 4C and 5A-5B, a portion 5 of the transfer 106a is shown in greater detail. The T-belts 418 are positioned between the rollers 112 and rotationally supported on the pulleys 428. The T-belts 418 are positioned between the rollers 112 to selectively transfer packages (materials) at right angles and to prevent interruption from jamming and/or other related problems. More specifically, closed gap transfer 106a may be capable of transferring a variety of standard and/or irregular packages 111 having various materials or shapes, such as rigid packages 111a, non-standard sized packages 111c, and/or non-rigid packages 111b, for example, in multiple directions.

In this version, the T-belts 418 are supported on a peripheral surface of pulley rollers 432 of pulleys 428. The T-belts 418 are shaped and positioned to close a gap G' between the rollers 112 and the T-belts 418. The T-belts 418 may be configured to prevent packages (including irregular (e.g., non-standard sized and non-rigid) packages) from falling into the gaps G', thereby preventing jams and unnecessary interruptions to shipping operations.

The shape of the T-belt 418 is configured to reduce the gap G' between the rollers 112 and the T-belt 418. The T-belt 418 may be in engagement or near engagement with the rollers 112 to reduce the gap G' to, for example, a width less than a thickness of a flexible package 111b, a smallest dimension of the non-standard package 111c (e.g., a size less than about 4 mm and/or less than another minimum dimension of a selected item). The T-belts 418 may be comprised of a flexible material that prevents interference and wear issues with the rollers 112 if contact is made between the same.

Other features, such as linear bearings 454a, b, c for the tub 421, frame 110, and cam lift 438, respectively, may also be provided.

FIGS. 5A-6B illustrate how the transfer 106a may operate to provide material transfer of the packages 111 in a desired direction. FIG. 5A shows the transfer 106a positioned to move the packages 111 in the main linear direction D via T-belts 418. As can be seen in FIG. 5A, the rollers 112 have been lowered (opposite the lift direction F) exposing the T-belts 418 and thus permitting transfer in the main linear direction D.

FIG. 5B shows the transfer 106a with the rollers 112 raised to change direction of transfer to the perpendicular linear direction B. The T-belts 418 are positioned below rollers 112 on pulley rollers 432 with the rollers 112 therebetween to allow the rollers 112 to move up and down between the T-belts 418. Vertical adjustment of the tub 421 in the lift direction F, may provide the engagement and disengagement of the rollers 112. The rollers 112 may be lifted via cam assembly 446 and driven by the motorized roller spindle 436 to rotate in a clockwise direction R (see FIGS. 4C, 5B-6B) to engage packages 111, positioned on the rollers 112 and moves them in the transfer linear direction B. Rotation may also be in a direction reverse to R to provide for multi-directional transfers.

As can be seen in FIGS. 4C-6B, the T-belts 418 may be shaped for engagement by the belt drive rollers 436. The T-belts 418 have a flat body supported on an end of the pulley rollers 432, and a tongue portion 462 extending below the body for and shaped to conform to the recess 460 in the belt drive rollers 460. Likewise, in order to keep the T-belts 418 in position and traveling along the desired paths in the main linear direction D, large pulley rollers 432 may be provided each having the groove 460 corresponding to the tongue portion 462 of the T-belt 418. The T-belts 418 may have a width wider than the pulley rollers 432 to extend to a location adjacent the rollers 112 as shown in FIG. 5B.

As can be seen in one or more of FIGS. 5A-6B, the pulley rollers 432 may be mounted to, and supported by, a pulley support 434 (e.g., linear bearings 454a) via fasteners 422. Multiple pulley rollers 432 may support a single T-belt 418. Such narrow large pulley rollers 432 may further allow the roller 112 spacing to be reduced to enable more rollers 112 per length of a given section, thus facilitating the handling of non-standard sized (small) rigid packages 111c and non-rigid packages 111b. See FIGS. 6A and 6B.

The pulley rollers 432 may have a minimum interference I' value to provide a reduced gap G' between rollers 112 so as to enable closer spacing between rollers 112 and further allowing the T-belts 418 to cover most of the gap between rollers to prevent items from failing to travel across the transfer 106a. Accordingly, the T-belts 418 may overlap the interference gap G' between rollers 112 to eliminate gaps and thus provide a supported transition area between rollers 112 for packages 111 traveling in the main linear direction D. As demonstrated by FIGS. 6A-6B, the reduced gap G' and interference I' defined by the position of the T-belts 418 about rollers 112 may facilitate transfer of irregular packages, such as non-rigid packages 111b and non-standard sized packages 111c.

The vertical movement of the rollers 112 in the lift direction F, or the opposite of same, may be controlled to stop when the T-belts 418 are contacting or nearly contacting the rollers 112 when translating package in the main linear direction D. In addition, the drive belt rollers 436 may be controlled to cease rotating T-belts 418 when the rollers 112 are operating so as to prevent packages 111 from translating in the transfer linear direction B when contacting the T-belts 418 beneath the top surface of the rollers 112.

In other embodiments, and as will be understood by those skilled in the prior art, the tub 421 supporting the rollers 112 may be connected to the lift 438 to provide movement in the lift direction F for raising and lowering the rollers 112 for moving packages 111 in the transfer linear direction B. In such embodiments, vertical movement of the rollers 112 in the lift direction F, or the opposite of same, may be controlled to stop when the rollers 112 are contacting or nearly contacting the T-belts 418 when translating package in the perpendicular linear direction B. Accordingly, the present disclosure provides right angle material transfer capabilities to a variety of packages 111, for example.

FIGS. 7A-10C show another version of the transfer 106*b* having an integrated roller unit 712 and an integrated belt unit 718 supported on frame 110 and driven by a driver 719. FIGS. 7A-7D show perspective, top, plan, and side views, respectively of the narrow gap transfer 106*b*. FIGS. 8A-8D show various exploded views of the transfer 106*b*. FIGS. 9A-9B show various views of the integrated belt unit 718. FIGS. 10A-10E show various views of the roller unit 712.

Figure 8A:
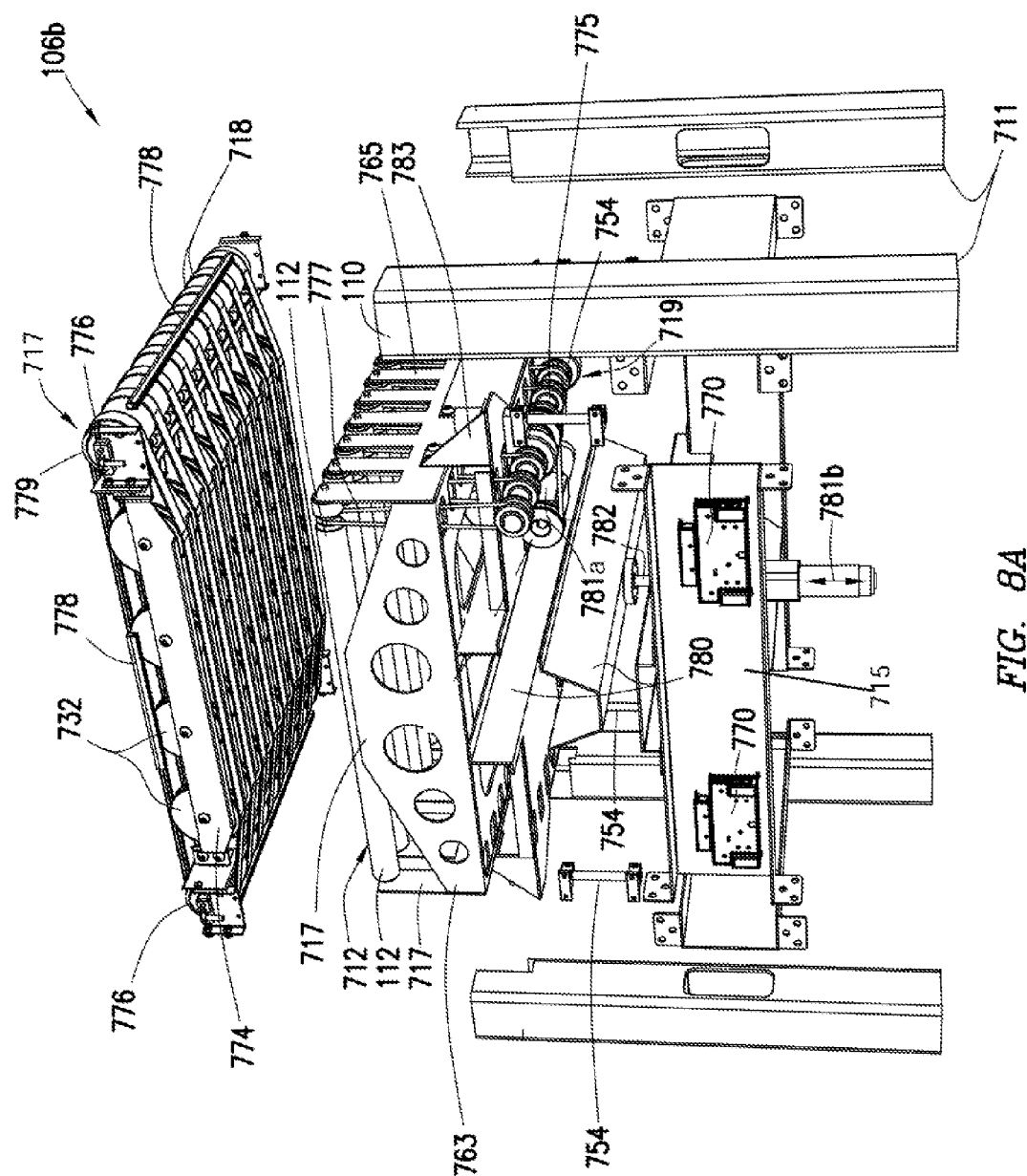
FIGS. 8A-8D show exploded views of the integrated closed gap transfer of FIG. 7A.
Figure 8B:
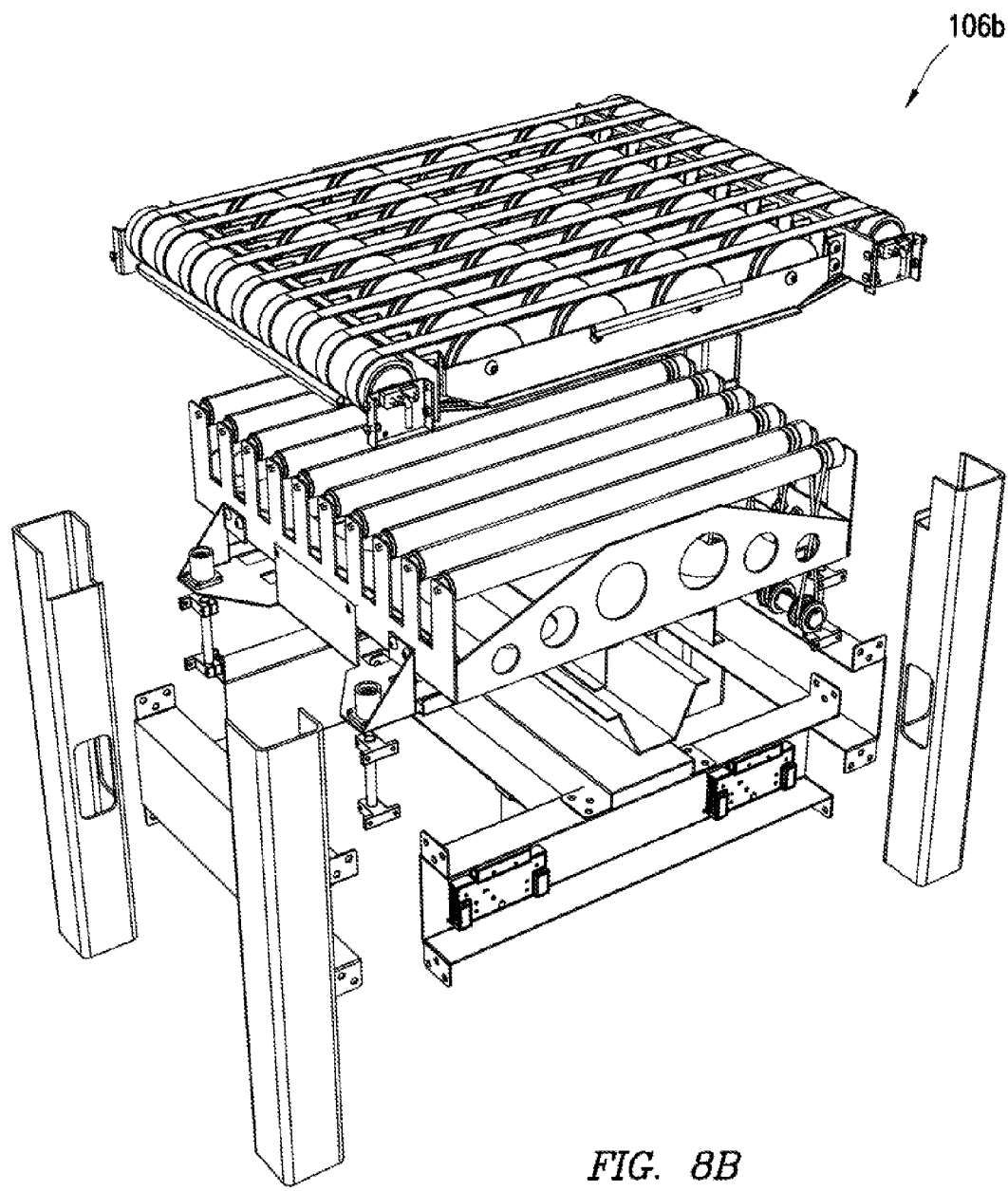
Figure 8C:
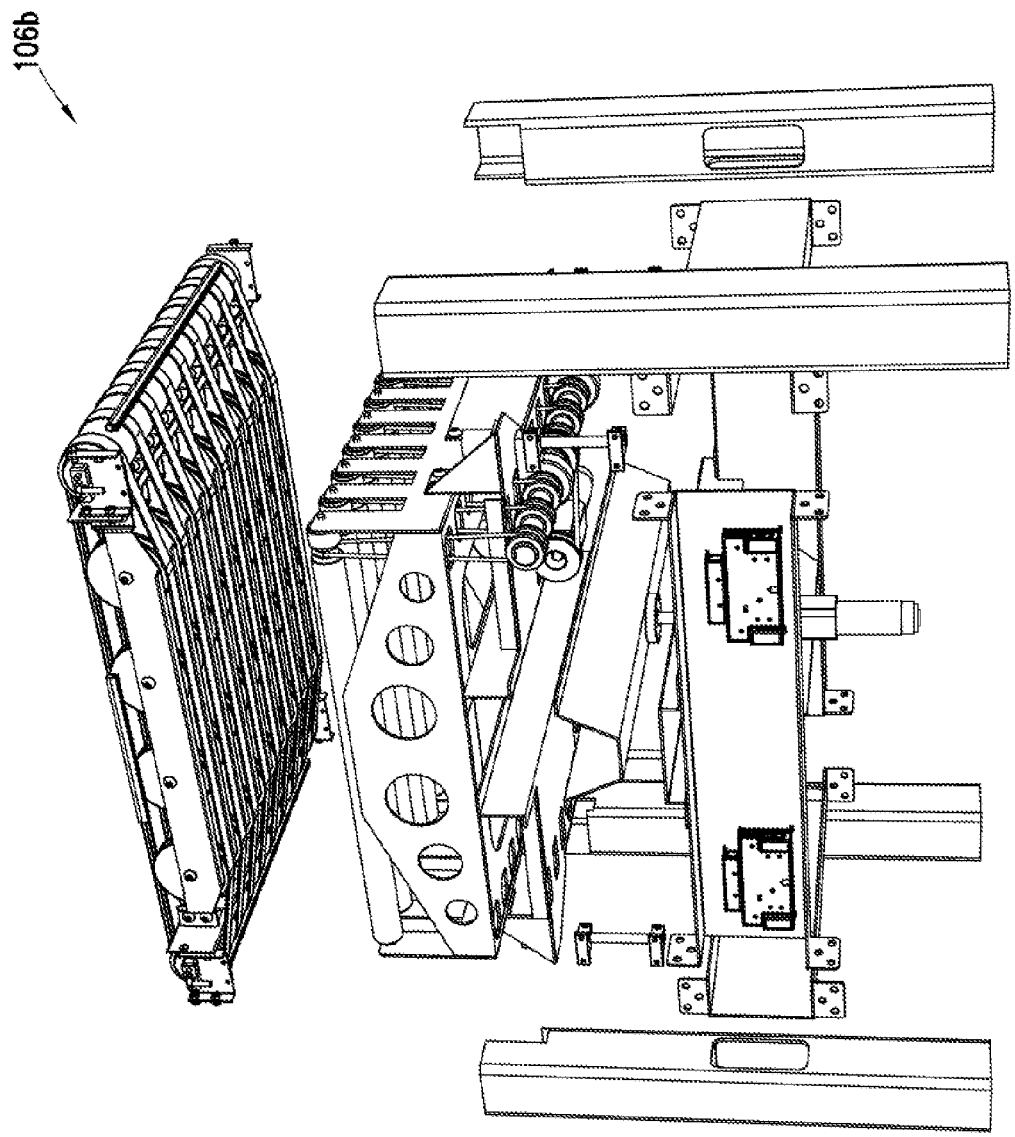
Figure 8D:
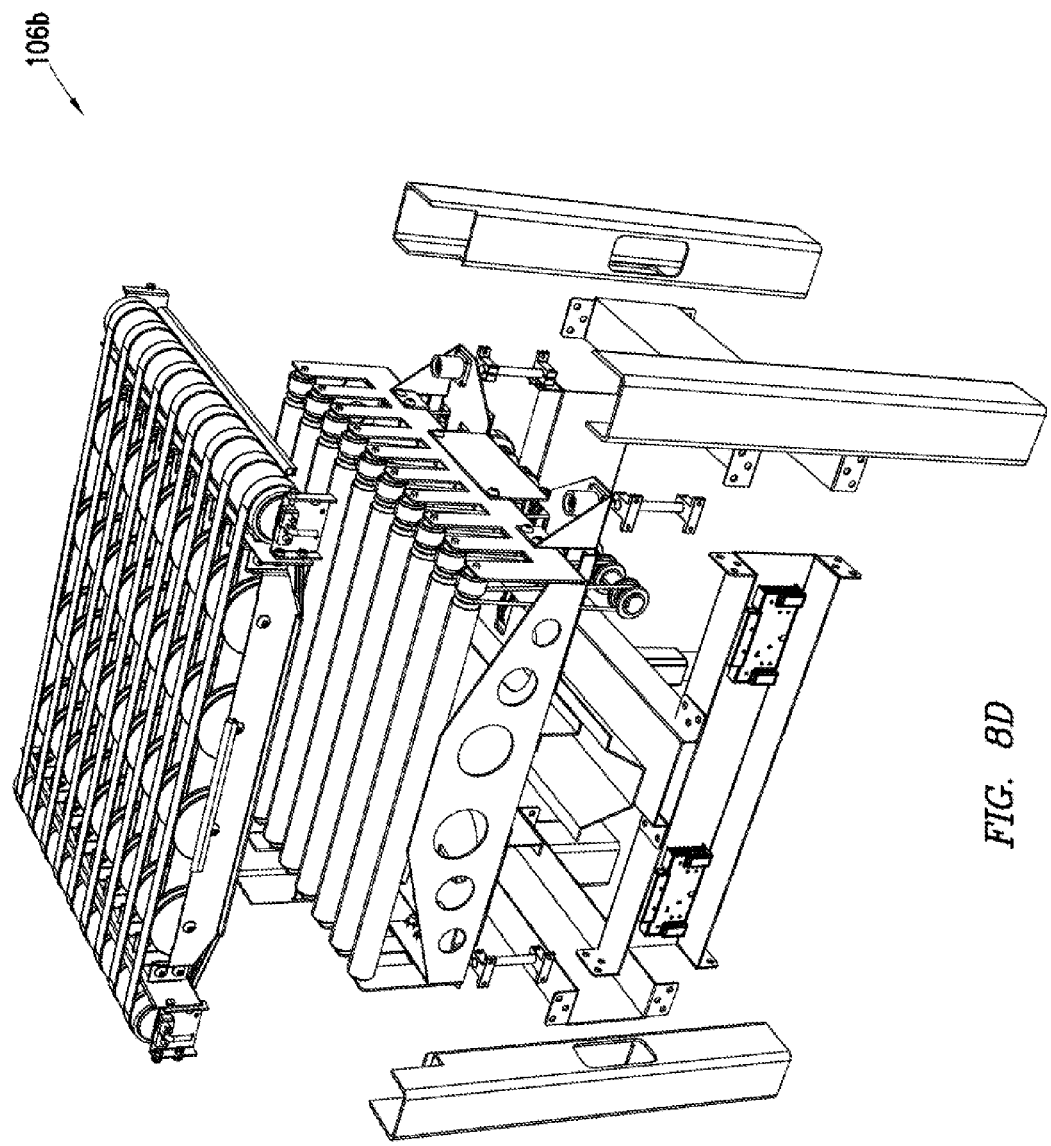

Referring to FIG. 8A, the frame 110 may include legs 711 and frame supports 715 as previously described. Optionally, as shown, a cover 769 may be positioned on the frame 110. The frame 110 is connectable to the main conveyor 102, and supports the integrated roller unit 712 and the integrated belt unit 718 thereon for use with the main conveyor 102. The frame 110 may also be used to support other devices, such as bearings 754 and controller(s) 770.

Figure 7A:
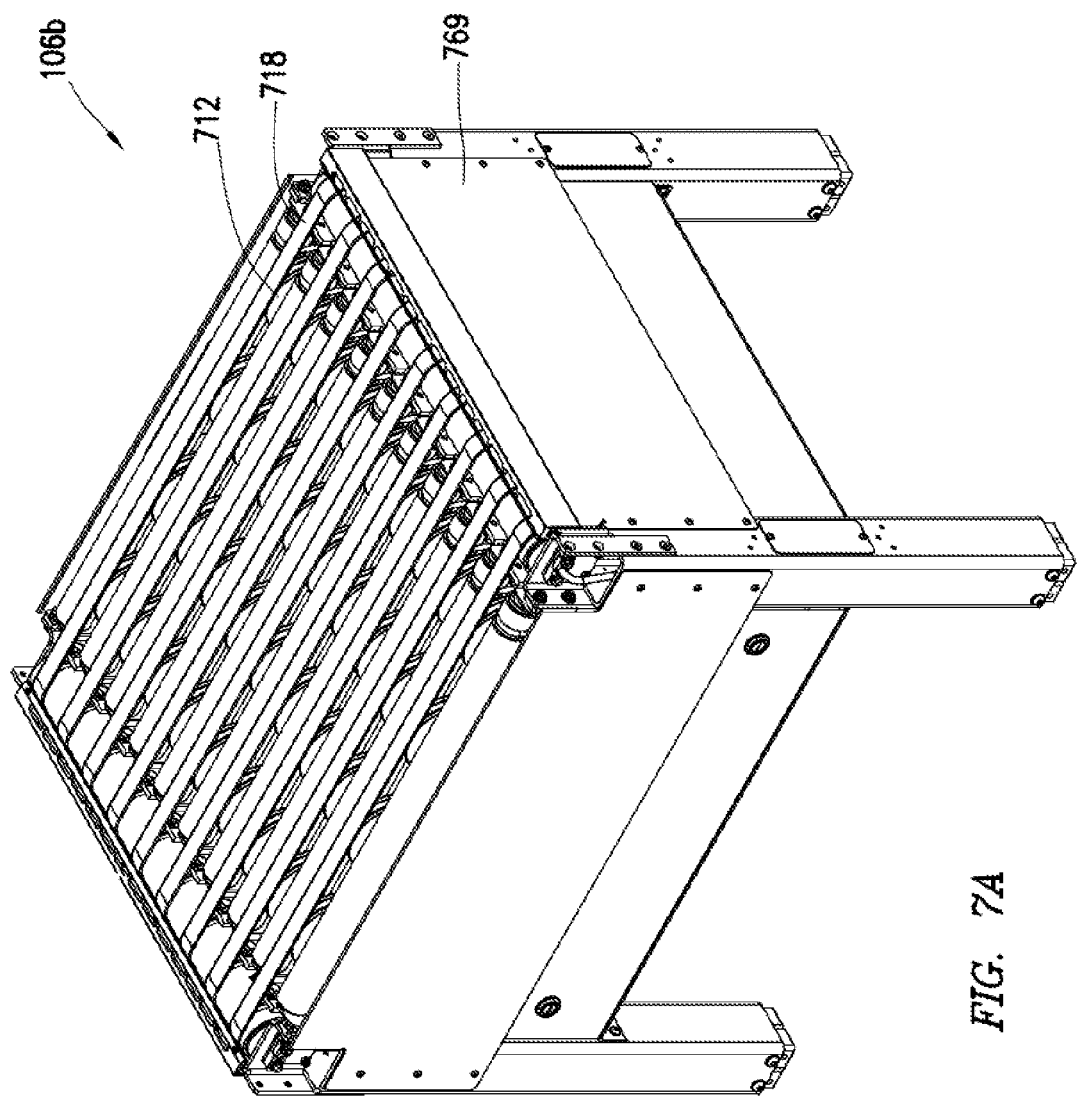
FIGS. 7A-7D are perspective, top, plan, and side views, respectively, of an integrated closed gap transfer having an integrated belt unit and an integrated roller unit.
Figure 7B:
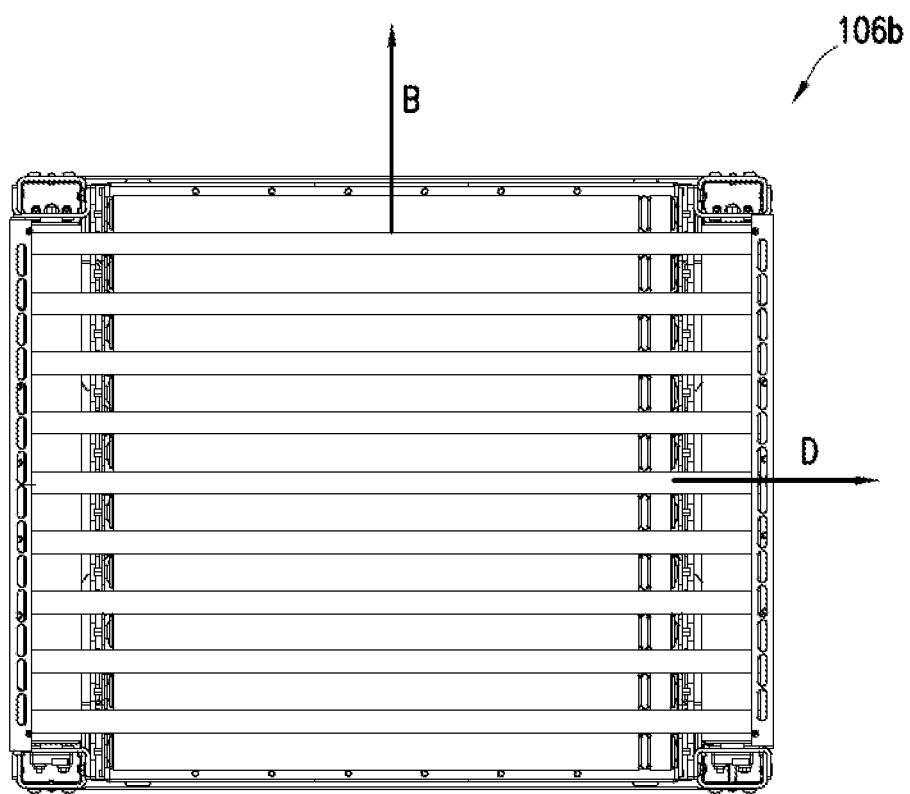
Figure 7D:
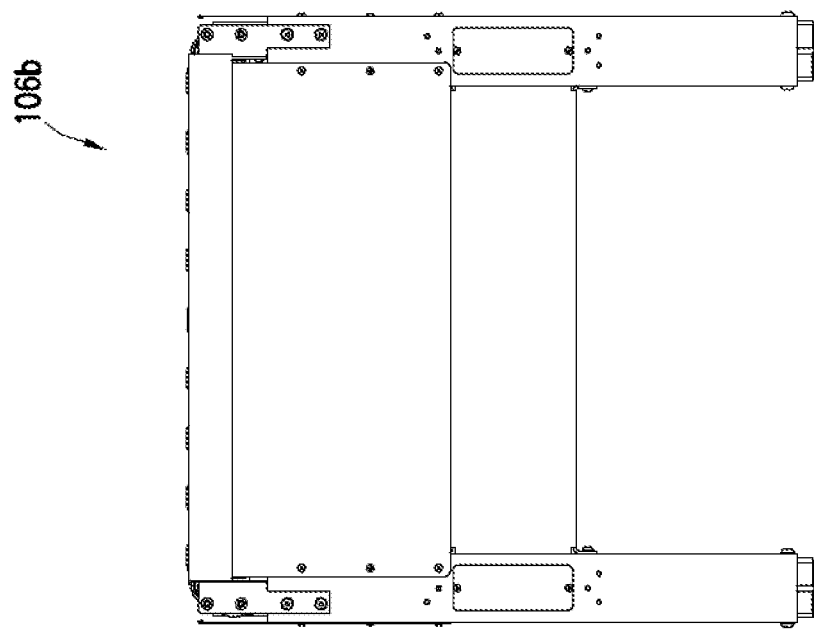
Figure 7C:
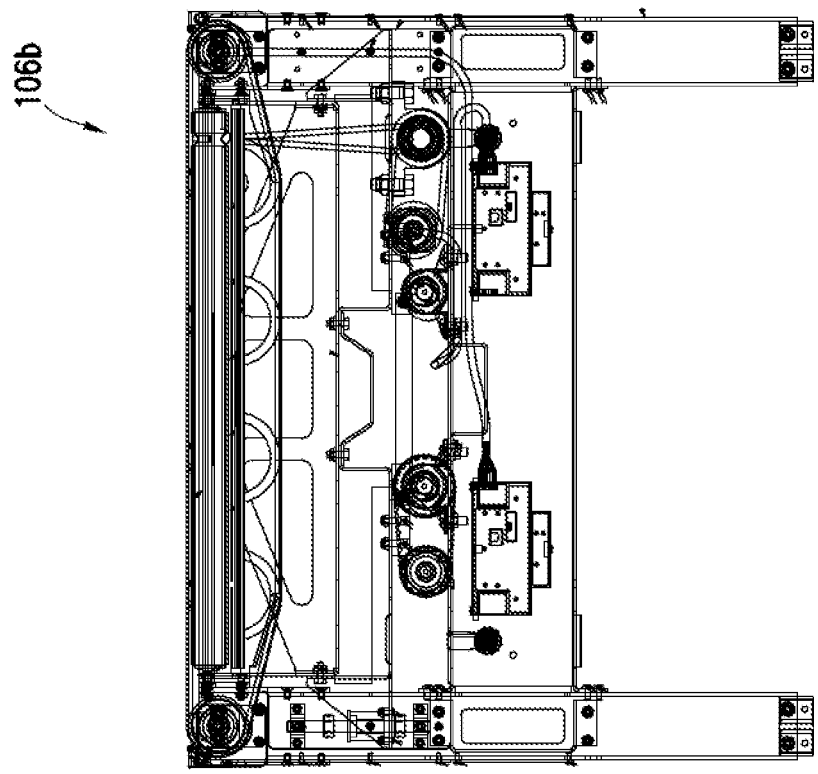

The roller unit 712 includes a tub 717 and the rollers 112. The tub 717 has a base 763 supported on the frame supports 715 of the frame 110 and support arms 765 extending above the base 763. As shown, the tub 717 may be a unitary member defining a support frame for supporting the rollers 112. The rollers 112 are rotationally supported on the support arms 765 of the tub 717, and oriented away from the main conveyor path D along the transfer path B (FIGS. 7B, 10A).

The belt unit 718 includes a belt frame 774, strip belts 718, and pulley rollers 732. The belt frame 774 is supported on the frame 110. The belt frame 774 may be supported on the legs 711 by mounts 776. Multiple series of pulley rollers 732 are rotationally supported on the frame 110. In the example shown, multiple sets of four of the pulley rollers 732 are linearly aligned along the belt frame 774. The sets of four pulley rollers 732 are spaced apart to receive the strip belts 718 thereon.

Figure 9A:
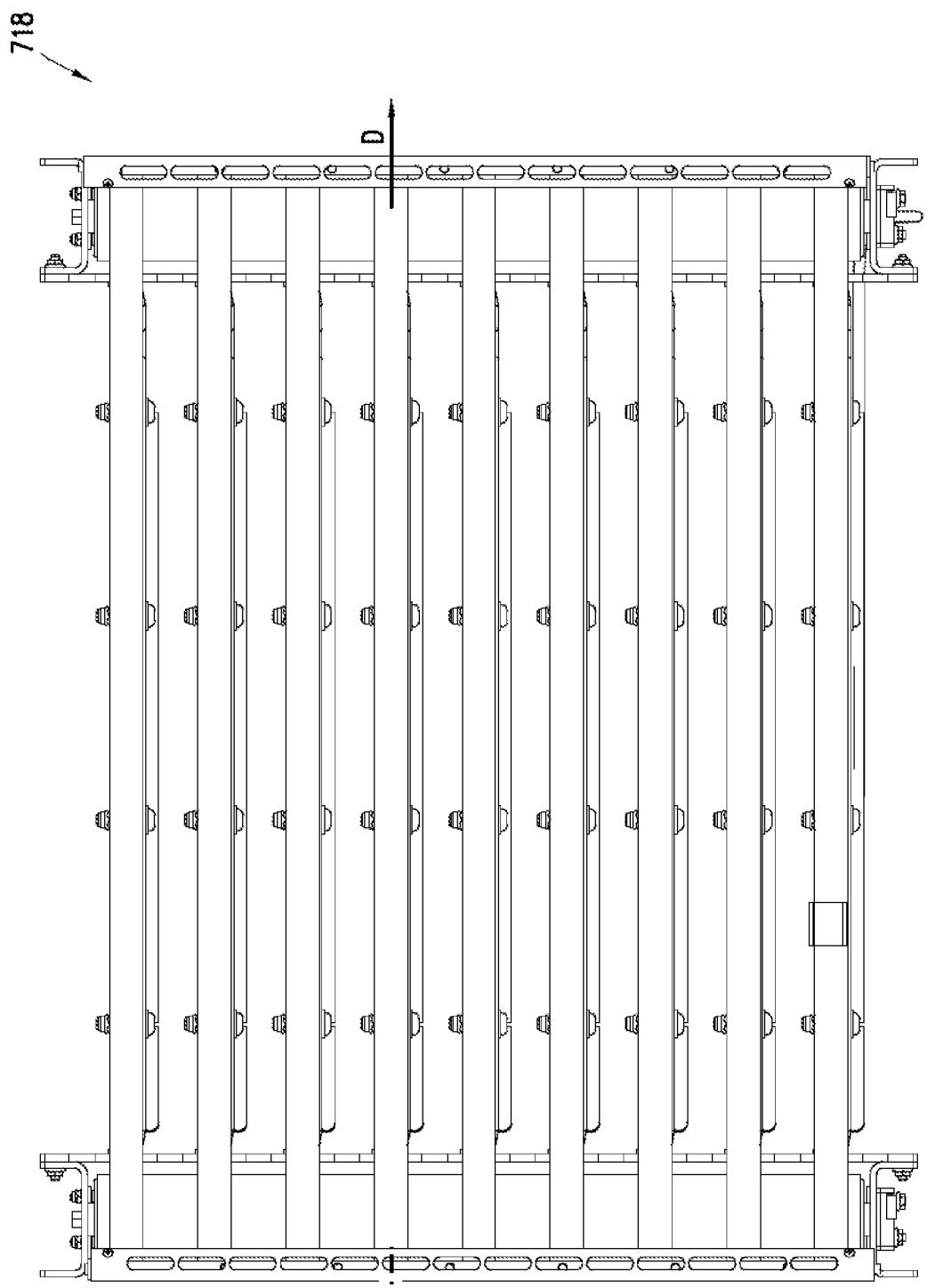
FIGS. 9A-9B show various views of the integrated belt unit.
Figure 9B:
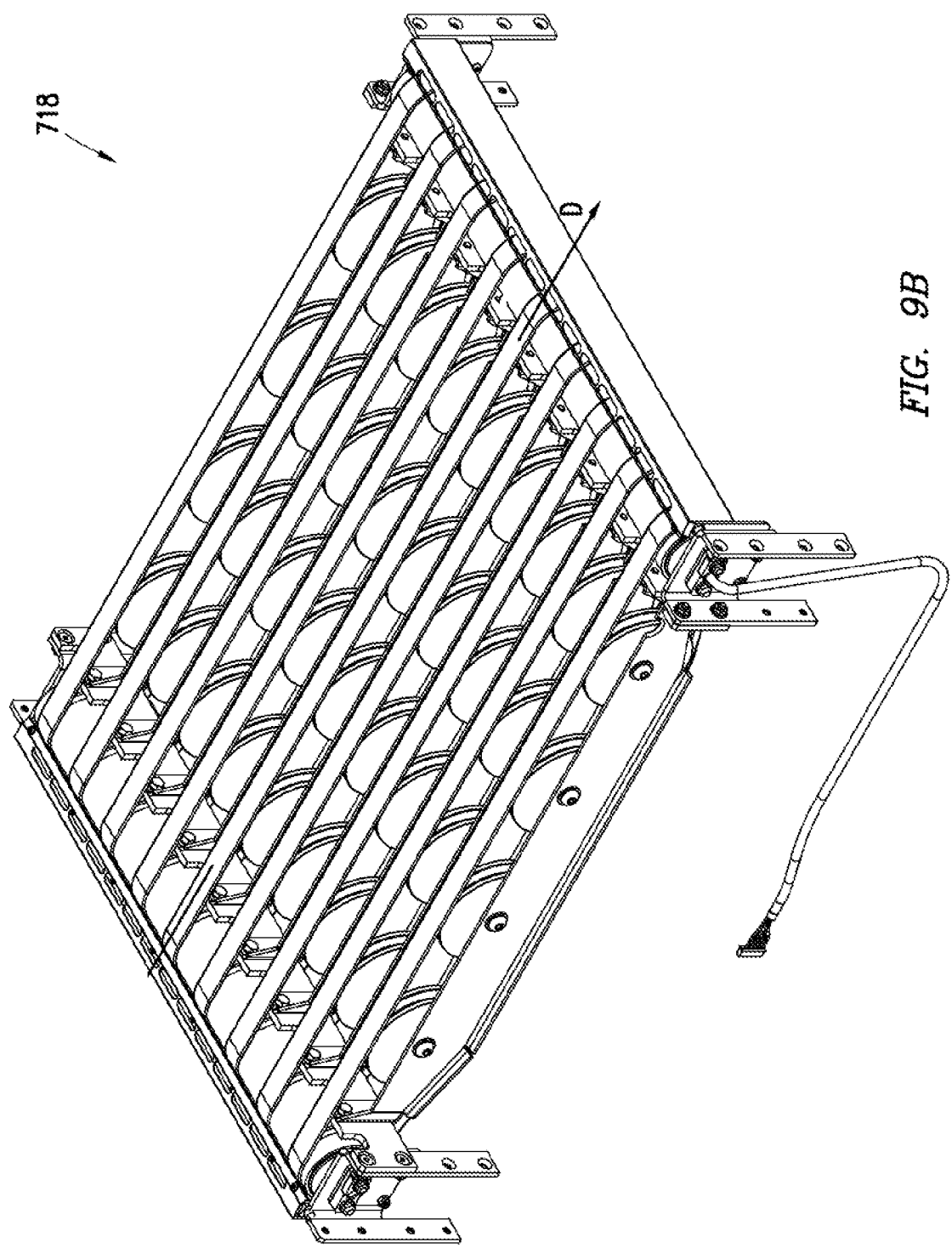
Figure 10B:
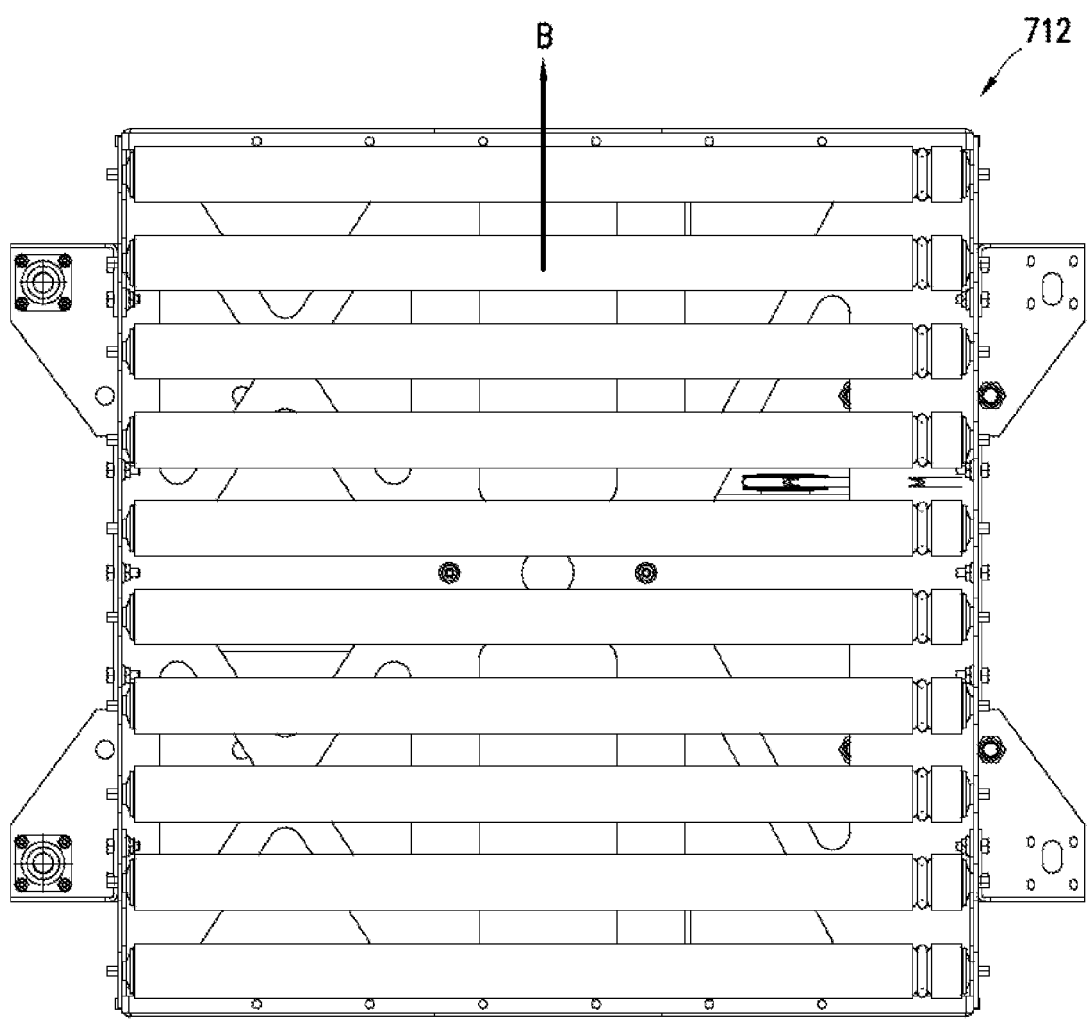
Figure 10C:
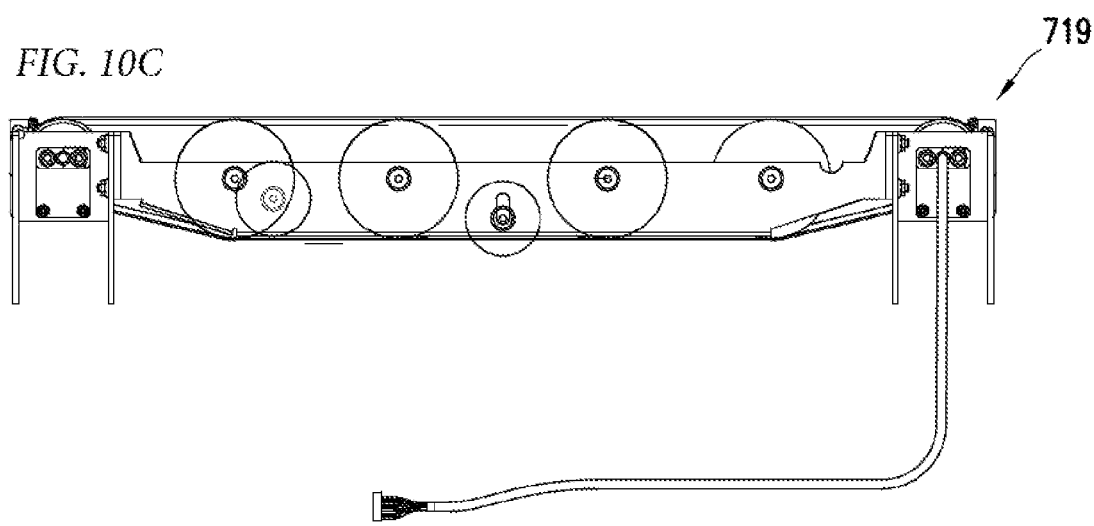
Figure 10D:
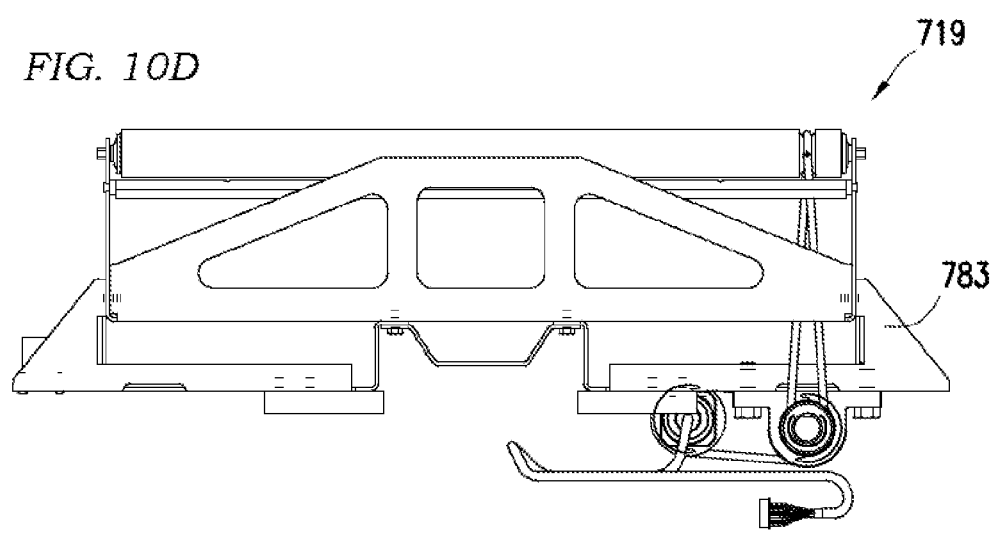
Figure 10E:
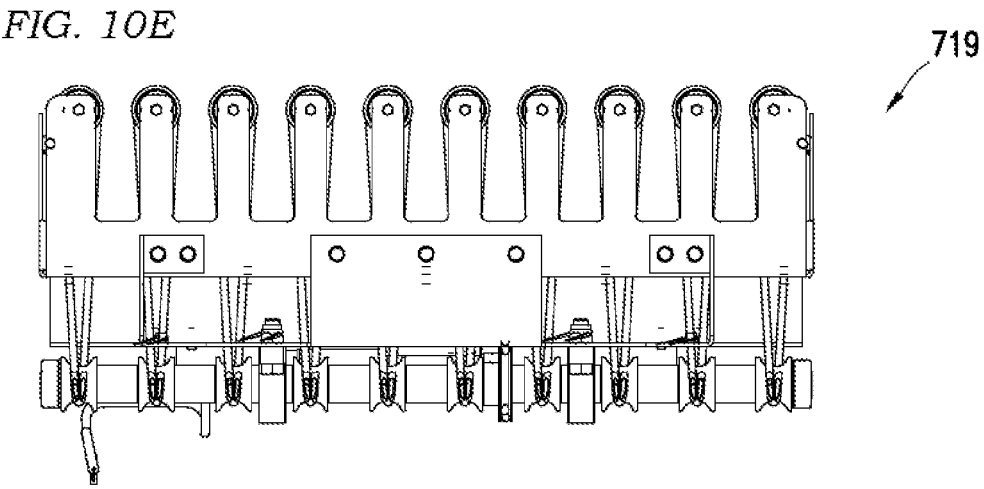

The strip belts 718 are disposed about the pulley rollers 732 and encircle the belt frame 774. The strip belts 718 are rotatable about the belt frame 774 along the pulley rollers 732. The pulley rollers 732 and strip belts 718 are spaced apart along the belt frame 774 such that each of the strip belts 718 is positioned between a pair of the rollers 112. The strip belts 718 are linearly aligned about the frame 110 to rotate in the direction of the main path D (FIG. 9A).

The driver 719 is operatively connected to the roller unit 712 and the belt unit 718 to selectively driver the rollers 112 and the strip belts 718 to transfer packages. The driver 719 includes a line shaft (or drive roller) 775 rotationally coupled to the rollers 112 by o-bands 777. The line shaft 775 has grooves to receive each of the o-bands 777. Each o-band 777 is disposed around the line shaft 775 and a corresponding roller 112 to transfer rotation therebetween.

The driver 719 also includes a belt driver roller 776 supported on the belt frame 774. The strip belts 718 are receivable in grooves along the driver roller 776. The grooves of the drive roller 776 are aligned with the rows of pulley rollers 732 to maintain the strip belts 718 in position relative thereto. The strip belts 718 are disposed around the drive rollers 776 to transfer rotation therebetween. The strip belts 718 may be positioned between the rollers 112 with the gap G' reduced therebetween in a similar manner to FIGS. 5A-6B.

The driver 719 also includes a lift 780, an actuator 782, and a guide 783. The lift 780 is movably supported on the frame 110. The actuator 782 is coupled to the lift 780 and the frame 110 to raise and lower the roller unit 712. As shown, the actuator 782 is a screw mechanism supported on the frame, but could be any extension mechanism (e.g., piston cylinder). The guide 783 is coupled to the tub 717 and interlockingly engageable with the belt unit 718. As the lift 780 lifts and lowers the roller unit 712, a corresponding groove along the belt frame 774 slidingly receives the guide 783 to maintain its position relative thereto.

The driver 719 is also provided with one or more motors to activate the line shaft 775, driver roller 776, and/or the lift 780. The driver(s) 719 may be, for example, a motor 781*a* (e.g., electric or hydraulic) to rotationally drive the line shaft 775 to rotate the rollers 112 and to rotationally drive the drive roller 776 to rotate the strip belts 718, and/or a motor 781*b* to extend and retract belt unit 718 via the lift 780. The driver 719 may also be provided with other features, such as a timing belt to selectively sequence the motors 781*a,b* and/or electronics (e.g., sensors, processors, and/or other devices). For example, photo arrays 778 are provided on the roller unit 712 to detect the position of packages about the transfer.

Various combinations of the features of the closed gap and integrated closed gap transfers 106*a,b* may be used to provide the desired operability for transferring packages about the conveyor system 100.

Figure 11:
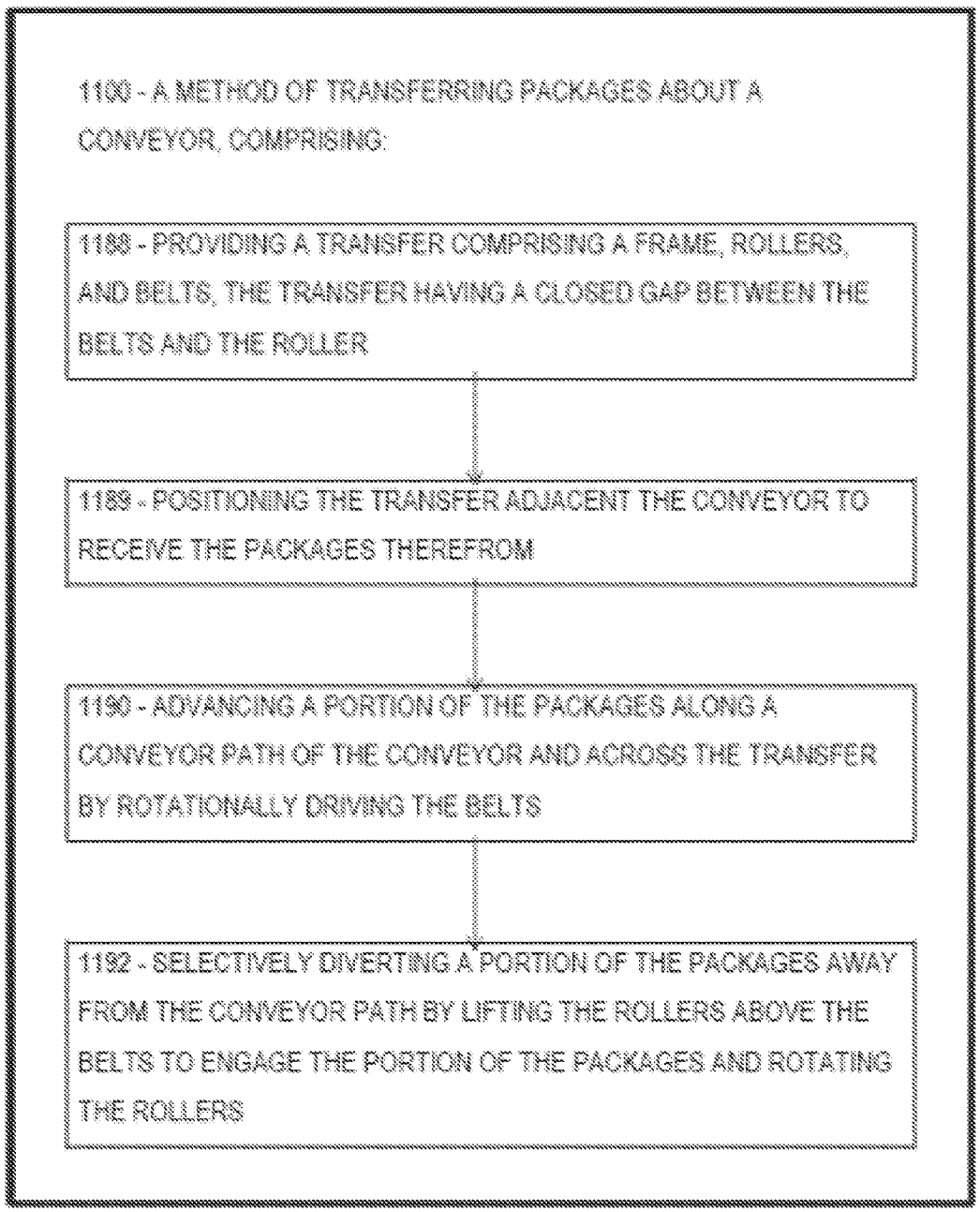
FIG. 11 is a flow chart depicting a method of transferring packages.

FIG. 11 shows a method flow chart depicting a method 1100 of transferring packages about a conveyor. The method 1100 involves 1188—providing a transfer comprising a frame, rollers, and belts. The transfer has a closed gap between the belts and the rollers. The method also involves 1189—positioning a transfer adjacent a conveyor to receive the packages therefrom, 1190—advancing a portion of the packages along a conveyor path of the conveyor and across the transfer by rotationally driving the belts, and 1192—selectively diverting a portion of the packages away from the conveyor path by positioning the belts and the rollers such that the rollers are above the belts to engage the portion of the packages and rotating the rollers.

The method may be performed in any order and repeated as desired.

For purposes of the description herein, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the preceeding specification, are simply exemplary embodiments of the invention. Hence, specific dimensions and other physical characteristics related to the embodiments disclosed herein are not to be considered as unduly limiting.

Although the invention has been described in detail for the purpose of illustration based on what is currently considered to be the most practical and preferred embodiment(s), it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. Since other modifications and changes varied to fit particular operating requirements and environments will be apparent to those skilled in the art, the invention is not considered limited to the example chosen for purposes of disclosure, and covers all changes and modifications which do not constitute departures from the spirit and scope of this invention.

The above description is illustrative of the preferred embodiment and many modifications may be made by those skilled in the art without departing from the invention whose scope is to be determined from the literal and equivalent scope of the claims that follow.

While the embodiments are described with reference to various implementations and exploitations, it will be understood that these embodiments are illustrative and that the scope of the inventive subject matter is not limited to them. Many variations, modifications, additions and improvements are possible, such as various combinations of the features provided herein.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

It is to be expressly understood, however, that the drawings are for the purpose of illustration and description only and are not intended to unduly limit the present invention. As used in the specification and the claims, the singular form of "a", "an", and "the" include plural referents unless the context clearly dictates otherwise.

What is claimed is:

1. A transfer for diverting packages about a conveyor, the conveyor having a conveyor path extending between locations of a facility, the transfer comprising:
   a frame positionable about the conveyor;
   rollers rotationally supported on the frame, the rollers non-aligned with the conveyor path to define a transfer path away from the conveyor path;
   pulley rollers supported on the frame, a top end of the pulley rollers positioned horizontally between the rollers;
   belts rotationally supported on the pulley rollers, a portion of the belts extending beyond the pulley rollers to close a gap between the belts and the rollers, the belts aligned with the conveyor path; and
   a tub movably coupled to the frame to selectively lift the rollers above the belts to engage the packages whereby the packages are selectively movable to locations away from the conveyor path.

2. The transfer of claim 1, further comprising a driver comprising a drive roller coupled to the rollers to rotationally drive the rollers.

3. The transfer of claim 1, further comprising a driver comprising a drive roller coupled to the belts to rotationally drive the rollers.

4. The transfer of claim 2, wherein the driver comprises a pulley coupled to the rollers, the pulley comprising the pulley rollers and o-bands.

5. The transfer of claim 1, further comprising a lift to raise and lower the tub.

6. The transfer of claim 5 wherein the lift comprises a screw motor.

7. The transfer of claim 5, wherein the lift comprises a cam and follower.

8. The transfer of claim 1, wherein the belts comprise T-belts, the T-belts having a lip receivable by the pulley rollers.

9. The transfer of claim 1, wherein the belts comprise strip belts.

10. The transfer of claim 1, wherein the rollers and the tub are integrated on a roller frame.

11. The transfer of claim 1, wherein the rollers and the tub are not integrated.

12. The transfer of claim 1, wherein the rollers are multi-directional.

13. The transfer of claim 1, wherein the frame comprises frame supports and legs.

14. The transfer of claim 1, wherein each of the belts is positioned between a pair of the rollers in contact therewith.

15. The transfer of claim 1, wherein the belts comprise linear belts extending between the rollers along a length of the rollers.

16. The transfer of claim 1, further comprising a driver to drive at least one of the belts and the rollers, the driver further comprising a timer to selectively raise the rollers.

17. The transfer of claim 1, further comprising bearings.

18. The transfer of claim 1, further comprising a photo array.

19. An integrated transfer for diverting packages about a conveyor, the conveyor having a conveyor path extending between locations of a facility, the transfer comprising:
   a frame positionable about the conveyor;
   a roller unit supported on the frame, the roller unit comprising rollers and a tub, the rollers non-aligned with the conveyor path to define a transfer path away from conveyor path; and
   a belt unit supported on the frame, the belt unit comprising a belt support and belts, the belt support comprising pulley rollers, a top end of the pulley rollers positioned horizontally between the rollers, the belts integrated with the belt support and the belts rotationally supported thereon, the belts positioned on the pulley rollers with a portion of the belts extending beyond the pulley rollers to close a gap between the belts and the rollers, the belts aligned with the conveyor path;
   wherein the tub is movably coupled to the frame to selectively lift the rollers above the belts to engage the packages whereby the packages are selectively movable to the locations away from the conveyor path.

20. A method of transferring packages about a conveyor, comprising:
   providing a transfer comprising a frame, rollers, pulley rollers, and belts, a top end of the pulley rollers positioned horizontally between the rollers;
   positioning the belts on the pulley rollers with a portion of the belts extending beyond the pulley rollers to close a gap between the belts and the rollers;
   positioning the transfer adjacent the conveyor to receive the packages therefrom;
   advancing a portion of the packages along a conveyor path of the conveyor and across the transfer by rotationally driving the belts; and
   selectively diverting a portion of the packages away from the conveyor path by lifting the rollers above the belts to engage the portion of the packages and rotating the rollers.

21. The transfer of claim 1, wherein the belts have a top surface for receiving y engaging the packages and a lip extending below a bottom surface of the belts, the lip receivable into a recess in the pulley rollers.

22. The transfer of claim 1, wherein the belts have a width wider than a width of the pulley rollers.

23. The transfer of claim 1, wherein the belts have side edges positionable adjacent the rollers to reduce the gap therebetween.

\* \* \* \* \*